(12) United States Patent  (10) Patent No.: US 9,070,098 B2
Miller  (45) Date of Patent: Jun. 30, 2015

(54) BACKGROUND INVESTIGATION MANAGEMENT SERVICE

(76) Inventor: Tyler J. Miller, Seattle, WA (US)

( * ) Notice: Subject to any disclaimer, the term of this patent is extended or adjusted under 35 U.S.C. 154(b) by 60 days.

(21) Appl. No.: 13/441,648

(22) Filed: Apr. 6, 2012

(65) Prior Publication Data

US 2012/0317174 A1  Dec. 13, 2012

Related U.S. Application Data

(60) Provisional application No. 61/472,556, filed on Apr. 6, 2011.

(51) Int. Cl.
  *G06F 15/16* (2006.01)
  *G06F 21/00* (2013.01)
  *G06F 7/00* (2006.01)
  *G06Q 10/06* (2012.01)

(52) U.S. Cl.
  CPC ..................................... *G06Q 10/06* (2013.01)

(58) Field of Classification Search
  USPC .......................................... 705/7.14; 709/206
  See application file for complete search history.

(56) References Cited

U.S. PATENT DOCUMENTS

| 7,136,865 | B1 * | 11/2006 | Ra et al. ................................. 1/1 |
| 7,346,541 | B1 * | 3/2008 | Cuttler et al. ................ 705/7.14 |
| 7,934,098 | B1 * | 4/2011 | Hahn et al. .................... 713/176 |
| 8,799,243 | B1 * | 8/2014 | Havlik .......................... 707/694 |
| 2005/0021476 | A1 * | 1/2005 | Candella et al. ................ 705/64 |
| 2005/0119875 | A1 * | 6/2005 | Shaefer et al. ..................... 704/7 |
| 2006/0018520 | A1 * | 1/2006 | Holloran ....................... 382/116 |
| 2008/0021759 | A1 * | 1/2008 | Wasley ............................. 705/9 |
| 2010/0287368 | A1 * | 11/2010 | Shuster et al. ................ 713/150 |
| 2010/0332405 | A1 * | 12/2010 | Williams ...................... 705/319 |
| 2012/0089528 | A1 * | 4/2012 | Parikh et al. .................. 705/321 |

* cited by examiner

*Primary Examiner* — Emmanuel L Moise
*Assistant Examiner* — Mahran Abu Roumi
(74) *Attorney, Agent, or Firm* — Rylander & Assoc., PC; Philip R. M. Hunt

(57) ABSTRACT

A web based software system generally designed for processing pre-employment background investigations is described. The software system allows an organization the ability to create and customize electronic documents to be sent to their applicants to complete via the web based software system, and returned in the same fashion. The subject matter turns much of a common pre-employment background investigation electronic, so that fewer hardcopy documents are necessary, thus creating more efficient management of individual background investigations.

14 Claims, 59 Drawing Sheets

BACKGROUND INVESTIGATION MANAGEMENT SERVICE

RELATED APPLICATIONS

This application claims priority to and the benefit of previously filed provisional Patent Application No. 61/472,556, entitled Background Investigation Web Services, filed on Apr. 6, 2011, which is hereby incorporated by reference for all purposes.

TECHNICAL FIELD

The subject matter generally relates to a system to facilitate the process of performing background investigations on a plurality of applicants.

BACKGROUND INFORMATION

In many areas, but particularly in the area of law-enforcement pre-employment background investigations, investigators report they spend, on average, 40 hours per applicant investigation. During this process, the applicant typically completes a paper packet comprised of questions pertaining to the applicant's life history, including information on criminal activity, financial history, drug history, listing relatives and personal references, employment history, and many other in-depth personal questions. The applicant typically submits this packet to the background investigator along with waivers and permissions (Agreements and Advisements) to conduct a background investigation. The investigator typically uses resources available to him or her to confirm the information the applicant provided in the various documents, to include, contacting past employers, supervisors, neighbors, relatives, references, landlords, etc., which makes up the bulk of the investigator's 40 hours per applicant of spent time.

What has eluded the industry is an automated system to help a background investigator more efficiently and effectively conduct a background investigation.

BRIEF DESCRIPTION OF THE DRAWINGS

The subject matter of this patent will become more readily appreciated and better understood by reference to the following detailed description, when taken in conjunction with the accompanying drawings, wherein:

Figure 6:
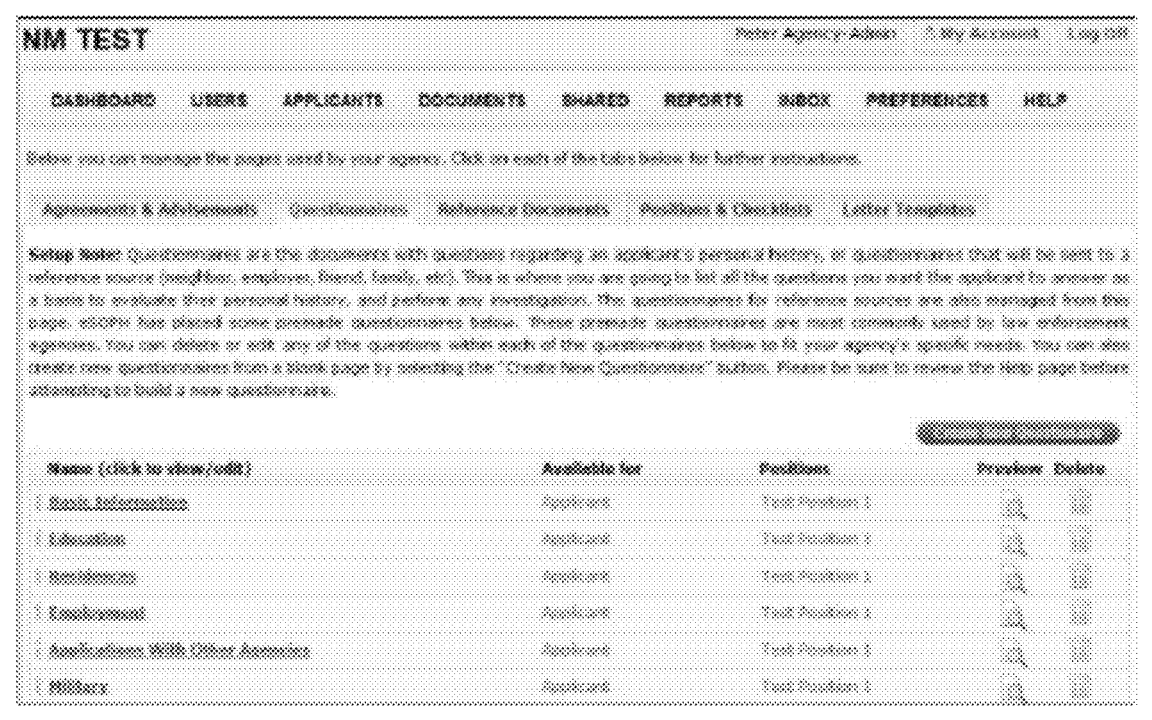

FIG. 6 is a screen display of a page that lists different questionnaires/forms, who they are available for, and what position the questionnaire/form is presently assigned to.

Figure 13:
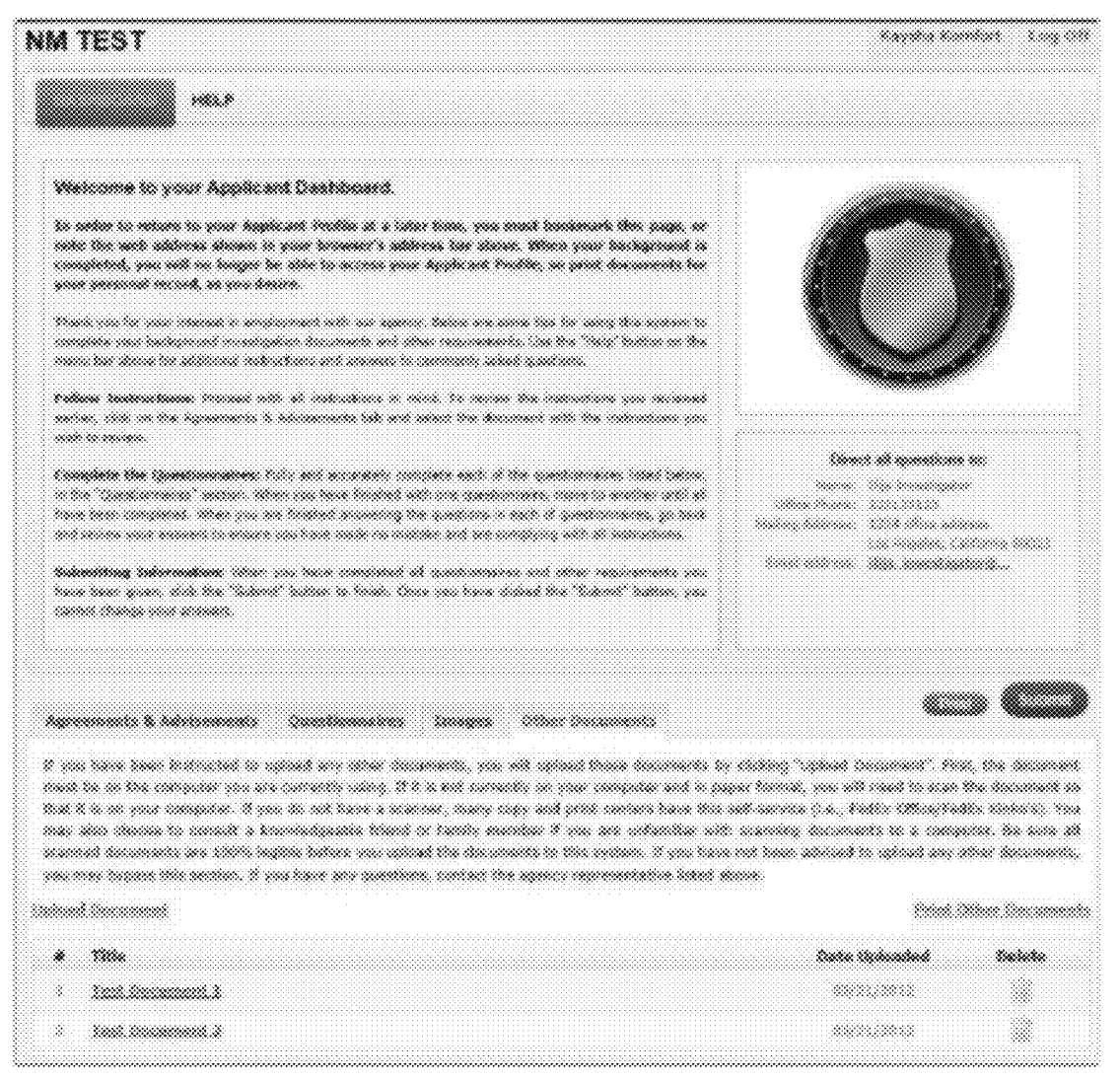

FIG. 13 is a screen display of a page where an applicant can upload and manage documents in their account "Applicant Profile."

FIG. 21 is a screen display of "By Position" data the system may generate based on other data and use within an account.

Figure 29:
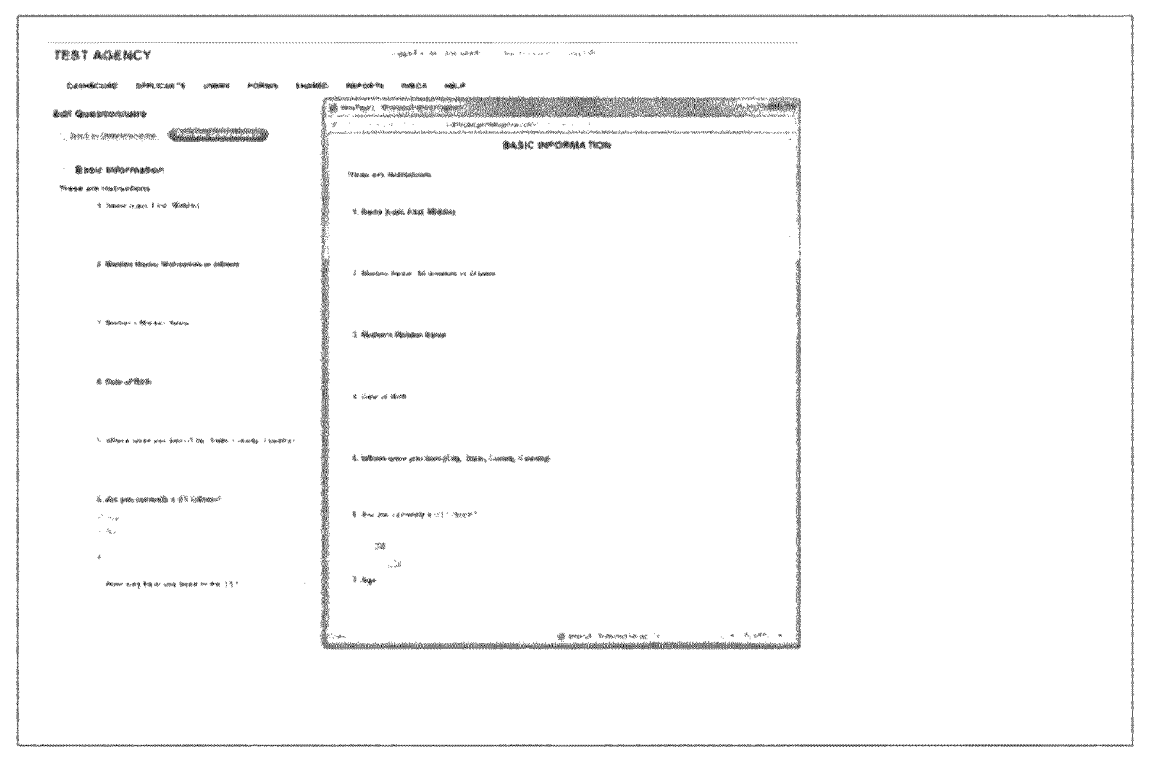

FIG. 29 are two screen displays showing and edit mode of a questionnaire/form and a preview mode of the same questionnaire/form.

Figure 38:
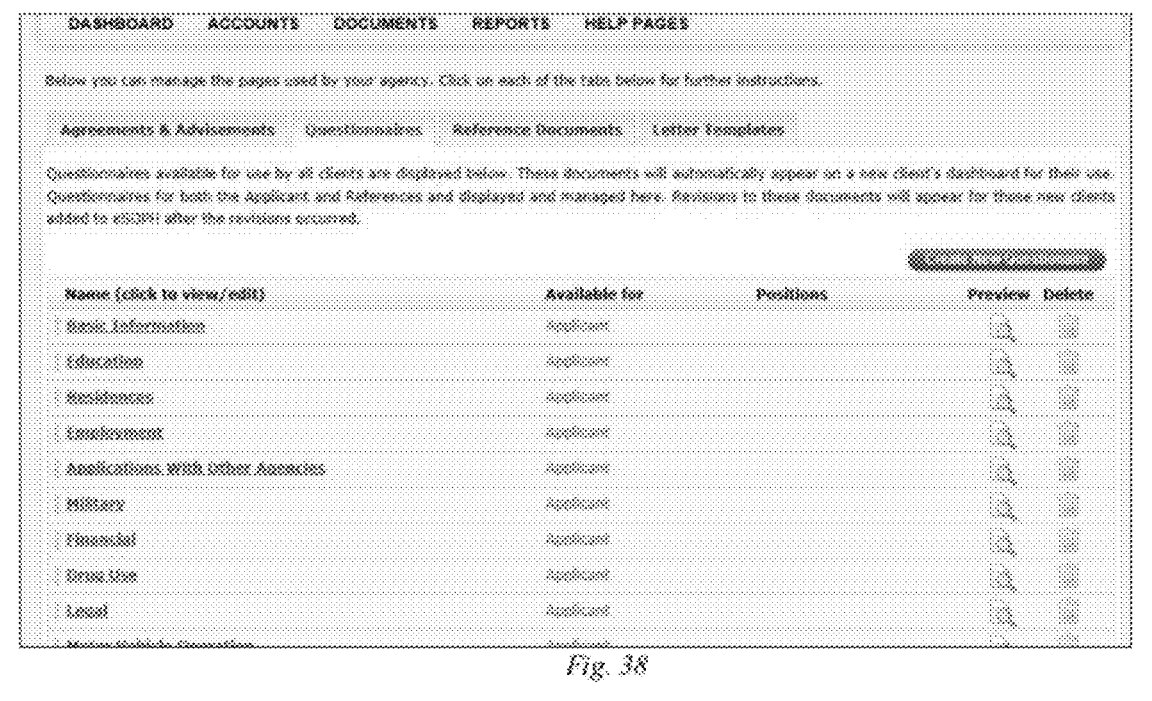
Figure 38:
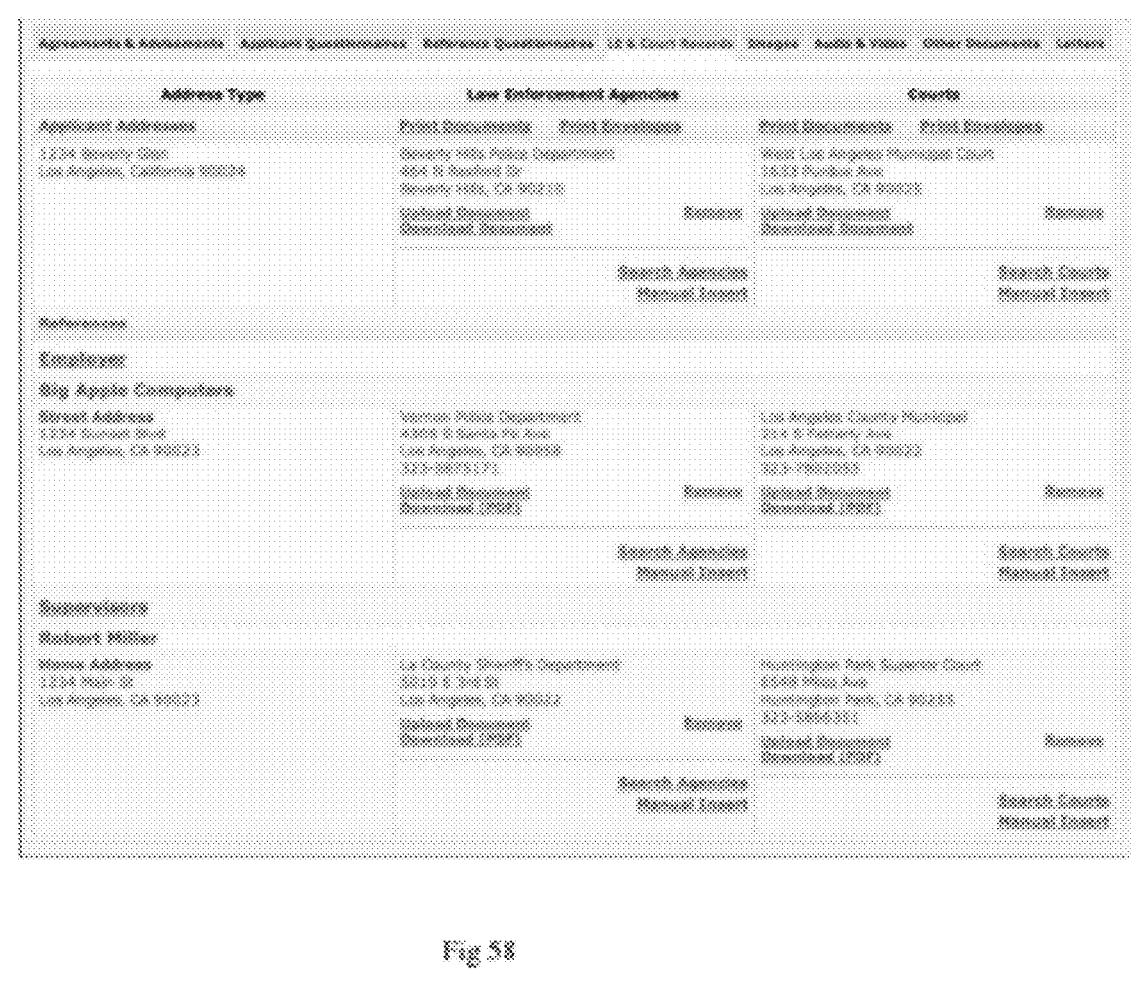

FIG. 38 is a screen display of a page to display and manage certain documents and related functions intended to be sent to and used by applicants.

Figure 39:
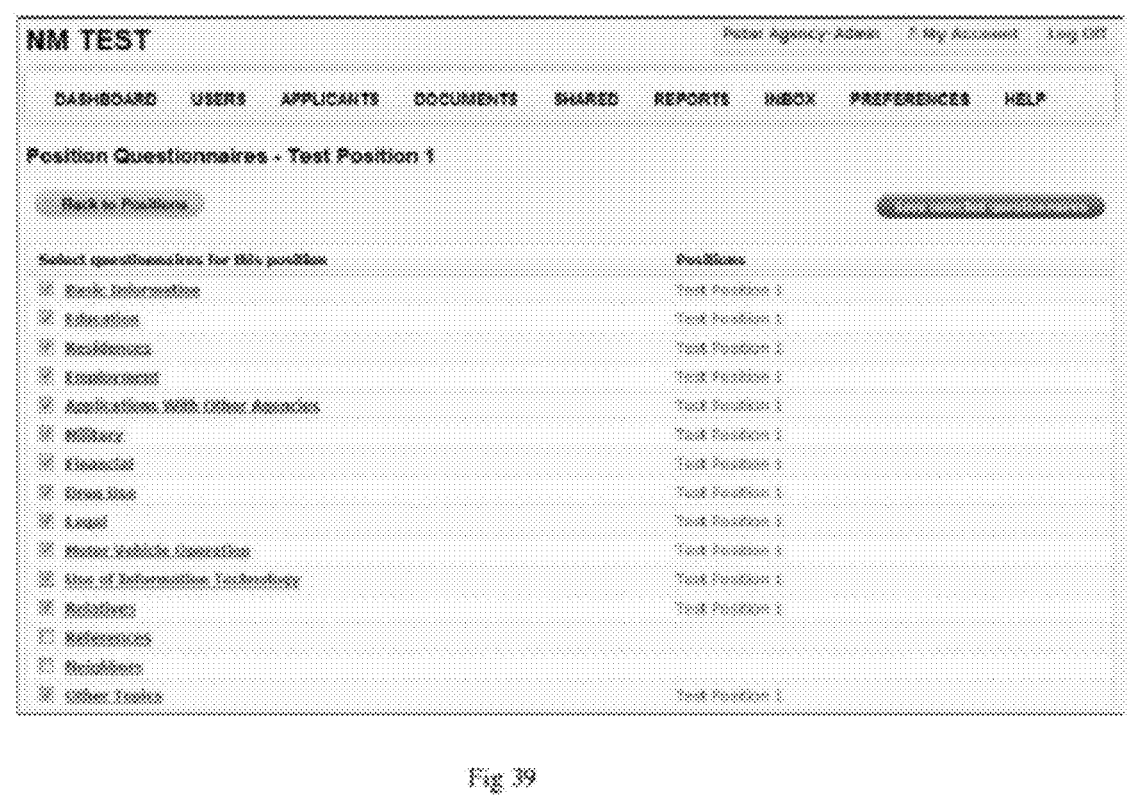

FIG. 39 is a screen display of a page for assigning questionnaires to a position.

Figure 45:
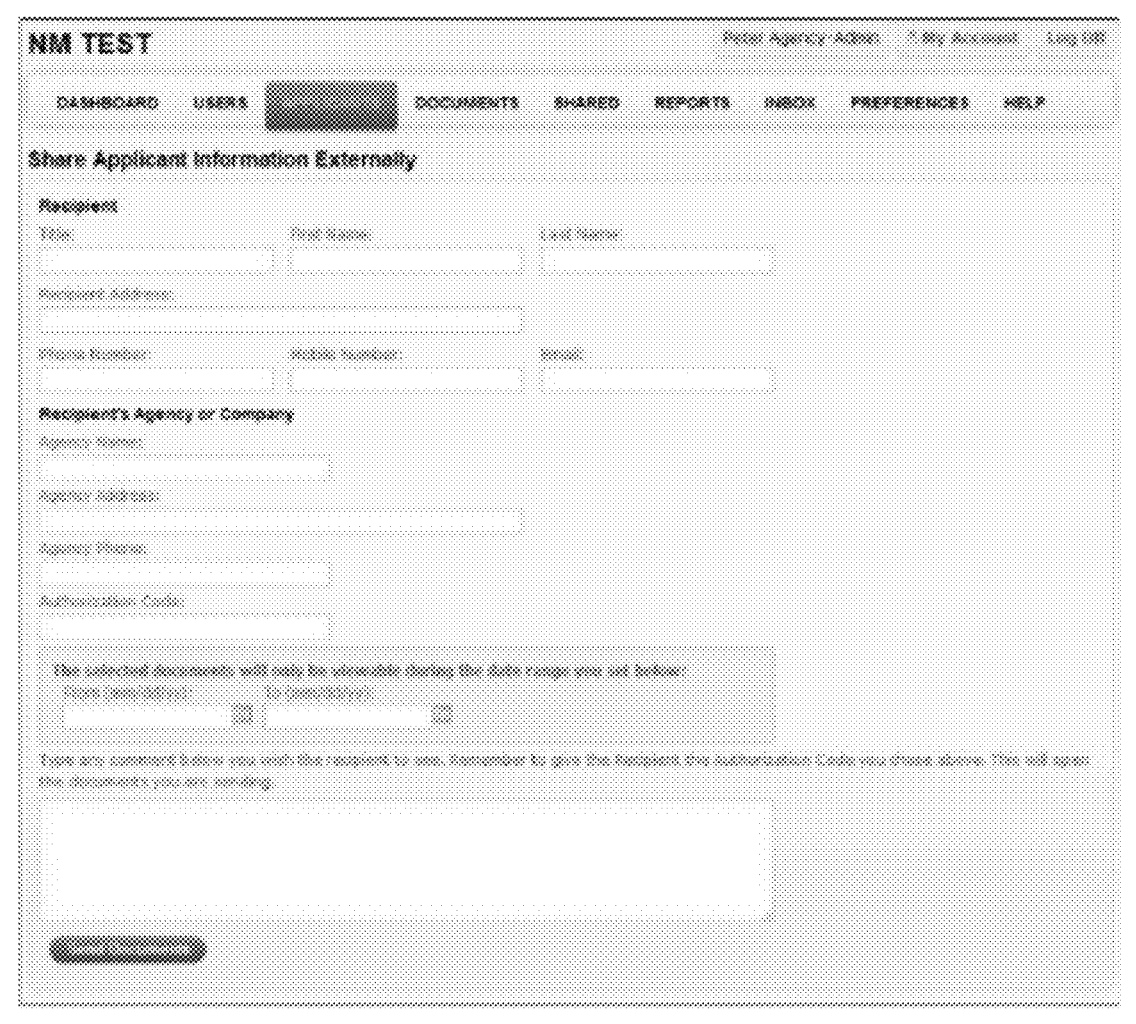

FIG. 45 is a screen display of the system's functionality to establish who can view information from a certain applicant's profile, along with authorization code and link expiration time frame.

FIGS. 50-61 are screen displays of additional components implementing embodiments of the software system.

DETAILED DESCRIPTION OF EMBODIMENTS

Various embodiments of the subject matter provide an automated system for organizing, managing, and reporting on pre-employment background investigations. Generally stated, the subject matter is directed to a web based software system for managing the process of performing pre-employment background investigations. Although described here as web based, other embodiments may be implemented that are not web based.

Figure 1:
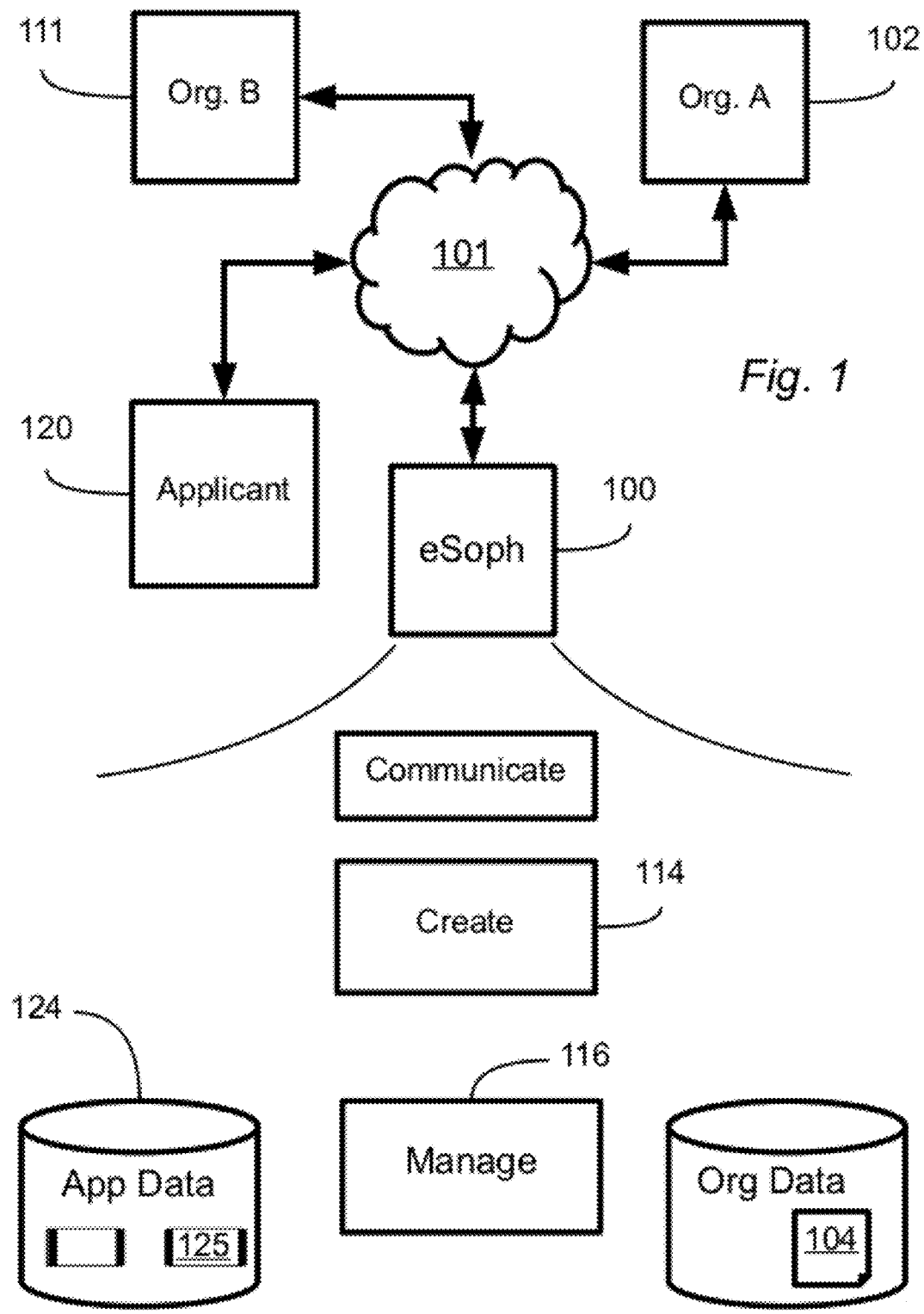
FIG. 1 is a functional block diagram generally illustrating core components of a background investigation management system in accordance with one illustrative embodiment of the invention.

Referring now to FIG. 1, a software system 100 allows an organization 102 the ability to create and customize electronic documents 104 to be sent to applicants to complete via the software system 100, and returned to the software system 100 in similar fashion. The software system 100 includes a document creation component 114 and a document management component 116. The system 100 automates the majority of the tasks of a common pre-employment background investigation so that fewer hardcopy documents are necessary, thus creating more efficient management of individual background investigations. One feature among many is the electronic sharing of applicant information 124 between organizations (e.g., Org A 102 and Org B 111) so the software system 100 may alert an organizational user (Org A 102) that an applicant 120 has already been entered into the system by another organizational user (Org B 111) of the software system 100. For example, among other types of information shared, organizations can be alerted if an applicant 120 was previously entered into the software system 100 by other organizations that use the software system 100. In that way, the second organization would have access to applicant information 125 about the applicant 120 that had been previously compiled, thus avoiding duplication of effort.

The software system 100 not only allows organizations to create 114 and manage 116 documents 104 used for background investigations, but included in this subject matter, the system 100 also automatically processes information entered in the documents to save organizations time and allow quicker turnaround of the background investigation.

The subject matter is anticipated to save organizations time and other costly resources. Organizations are given tools and resources that previously were not available to them without this software system.

Generally stated, the technical functions and features of the described system are initiated when a remote terminal communicates with a central computer (server) via the Internet or other network, such as an internal network, communicate with one another using the software system. A verified and authenticated connection is made between the central computer and the remote computer once the individual user's credentials are entered into login field(s) and then validated by the central computer, via the software system 100.

Organizational user accounts are created when a main master admin account (Personnel) user creates an admin account for a specific user group (customer's user group). The admin account for the user group is created when the Main Master Admin (Personnel) Account logs in and connects to the central computer via the remote computer and enters an email address and the customer's information. The user group admin account can add, edit, or delete (manage) other users within that user group. Once the connection is made, the connection is valid and features below will function provided the connection is maintained. If a pre-set amount of time passes without any activity on the remote terminal end, the application will terminate (session time out) the connection of the two computers and the user re-login. The software system 100 offers operative functionality to remote terminals (users) after successful connection to the central computer. This functionality is available when the remote terminal makes an authenticated connection with the central computer (sever) via a network 101, such as the Internet.

Specific functionality of one illustrative embodiment of the system will now be described with reference to several exemplary components which may be incorporated into one or more exemplary embodiments. Each of the following components and features may be implemented using software methods and processes executing on one or more computing systems, such as the illustrative computing system shown in FIG. 50 and described below. These exemplary components are not presented as being an exhaustive list, as the system 100 may implement other components in addition to these. Still further, certain of the following components may be omitted from the larger system without deviating in any material way from the scope and teachings of the core system 100.

Applicant Electronic Signature:

(FIGS. 32, 33, 16, 17, 9, 38, 41) Upon the applicant's registration process (first log in), the software system prompts the applicant to adopt an electronic signature. This is one of the first Agreements and Advisements (see the following "Agreements & Advisements" section) the applicant reviews and acknowledges during their first software session. The software system auto generates an electronic signature and displays it to the applicant. The applicant can agree to use the system suggested electronic signature, or not agree to the signature.

Agreement and Advisements:

(FIGS. 3, 9, 8, 16, 17, 25, 32, 33, 38, 40, 41, 44) Organization users can establish documents they wish an applicant to review and acknowledge the first time they log into the software. An applicant is sent an email with an invitation type message to let them know they have been selected to take part in a background investigation. They click on a link exclusive for them which take them into the software system. The first screen they see is a place to establish a private password and proceed.

When the applicant proceeds, they are routed to the first documents (Agreement or Advisement) the organization has selected for them to review. The content of the Agreements and Advisements documents can be anything the organization has imputed. The organization also chooses how they would like the applicant to acknowledge (certify/sign) the document. This can include the electronic signature the applicant has agreed to use, social security number (or any part of it), or initials. When certification fields that are required by the organization have been completed by the applicant for that specific document, the applicant can click a Proceed button which takes the applicant to the next Agreement and Advisement document (if one exists). An Agreement or Advisement document can also be set to "Hardcopy Submit" by the organization. This will cause a Print button to appear at the bottom of the page in addition to the Proceed button. If Hardcopy Submit is activated for that particular Agreement or Advisement document, the applicant will not see any way to certify the document online, and he or she print the document and follow instructions the organization has included in the body of the document.

Organization users control the different properties of the Agreements and Advisement documents by accessing their user dashboard, clicking on an Agreement and Advisements folder, and then selecting on the individual document they would like to edit.

Form/Questionnaire Builder:

(FIGS. 28, 29, 31, 27, 30, 5) The software system includes a form builder. This feature allows users at an organization to build questionnaires (forms) with questions and choose various styles of answers an applicant can give in response to a question. Text boxes for applicant responses can be set to expand as the applicant types. If an applicant answers a certain way (in example, the applicant answers "yes" to a yes or no question), the form builder can be set to ask additional sub questions based on the applicant's response. This eliminates the need for the applicant to see multiple questions that may not apply to the applicant's situation due to the applicant's previous response. Questions on any existing questionnaire can easily be edited or deleted at any time, even after the questionnaire is saved. There is no limit on the number of questionnaires that can be built. Questions can be programmed so that a certain response to a question creates a "flag" to draw the any reviewer's attention to that particular question. The software system also features a drag and drop feature that allows the users to arrange questionnaires as they would like to see them. How they are arranged is also the order they are presented to the applicant.

Figure 37:
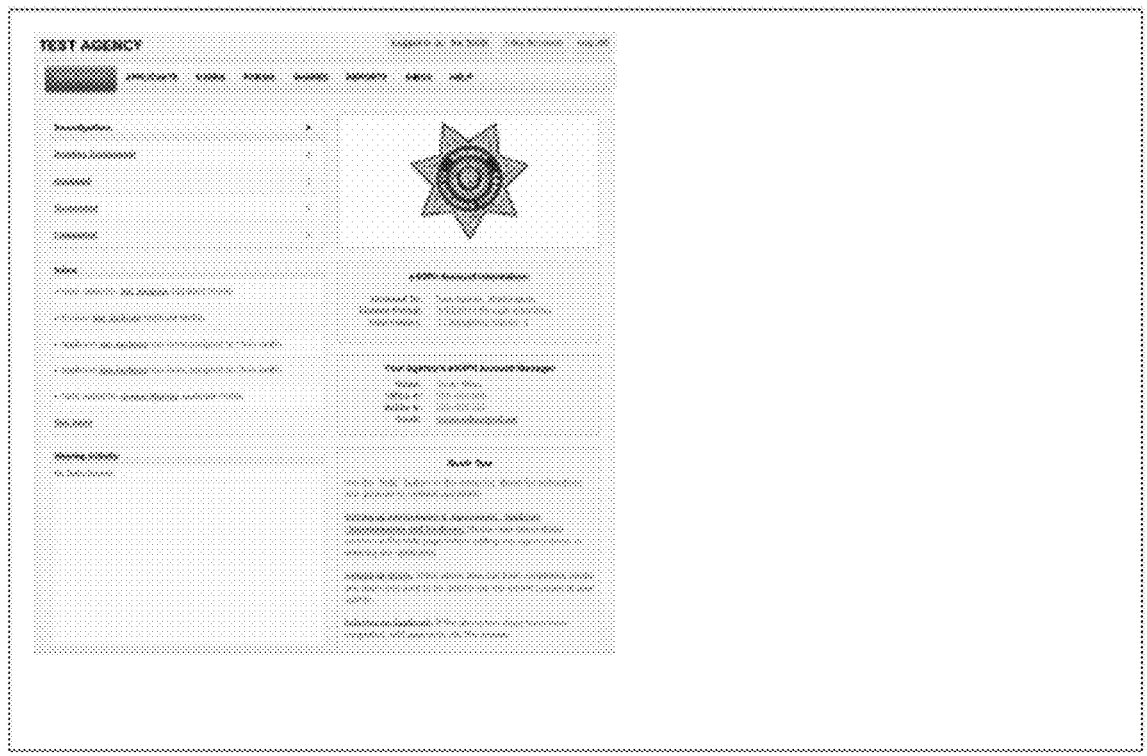
FIG. 37 is a screen display of a page to show important account and system information.
Figure 40:
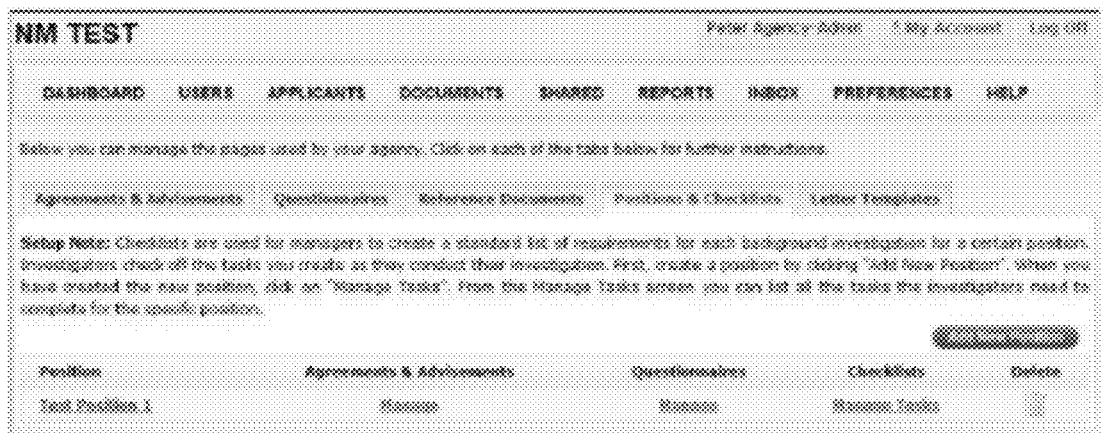
FIG. 40 is a screen display of a page to allow management of documents and task checklists for a position within an account.
Figure 41:
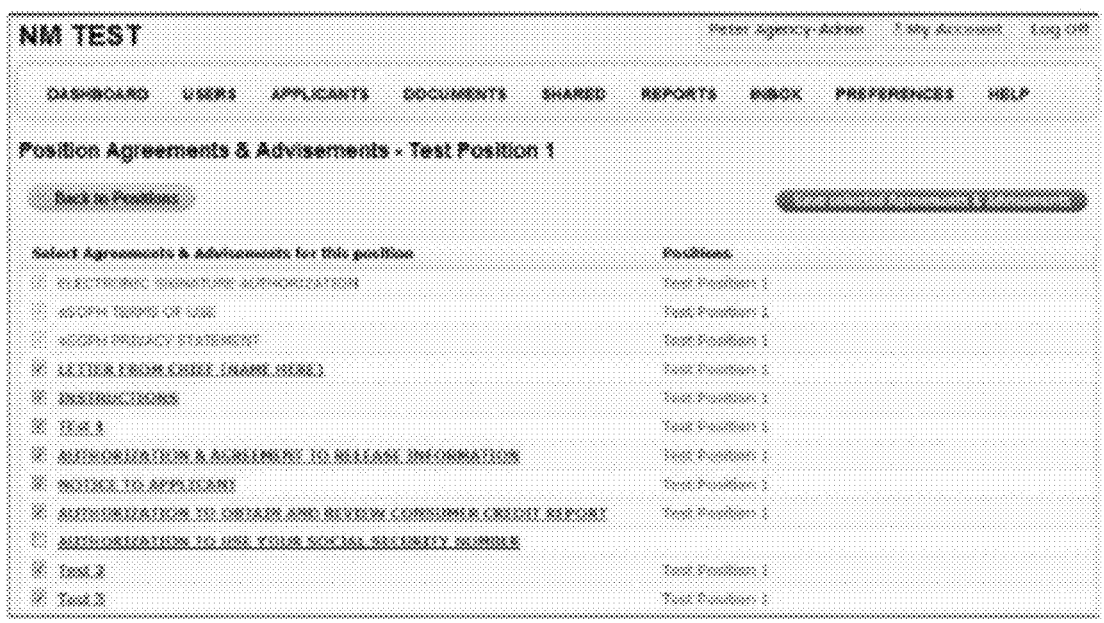
FIG. 41 is a screen display of a page for assigning documents/Agreements and Advisements to one or more positions.

Dashboard:

(FIG. 37) Each user of the software system is routed to a user dashboard once their login credentials are authenticated with the central computer (sever). In this embodiment, there are 6 types of dashboards: Admin dashboard, Agency Admin dashboard, Agency User dashboard, Applicant dashboard, Image Processor dashboard, and Administrative Agency dashboard. The system knows what dashboard to give a new user based on their account type, which is selected when the user if first entered into the software system. Each dashboard is programmed to display information specific to the type of user's needs and the job they are tasked with completing. On the dashboard page (and every other page) there is a menu bar at top where different pages of the software system can be accessed. The dashboard has a number view of applicants and their current status, an inbox with a number of most recent alerts and messages, a calendar display with upcoming appointments and controls for appointments, a summary of sharing activity, contact information for help, alert settings, and the agency's image and license information. From the dashboard, the user can access even more in-depth information, such as alerts and images, by clicking on the inbox link, which will route the user to main inbox page with the user's alerts with further ability to control the inbox functionality.

Figure 34:
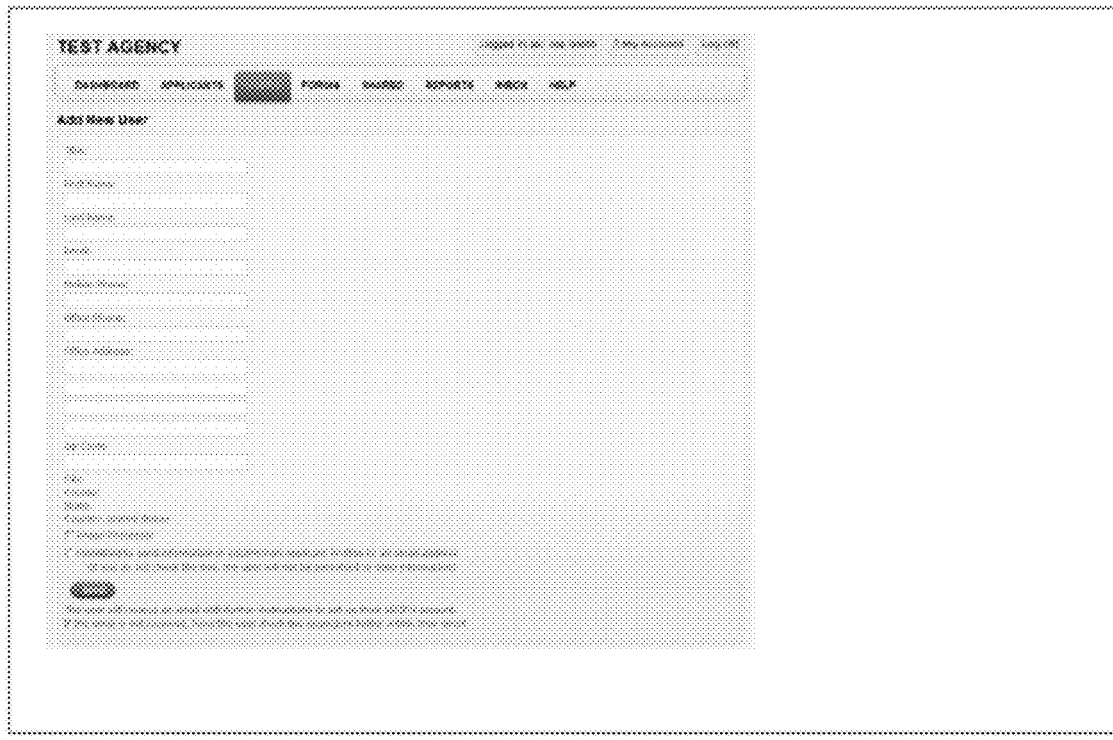
FIG. 34 is a screen display of a page for adding a new agency user into an agency's account on the system.

Managing Users:

(FIG. 34,) An Admin account for each organization is created at the time the organization's account is created within the software system. This main admin account at the organization can create additional admin accounts at the agency, or regular user accounts within the organization by accessing a "Users" page within the software system and completing questions related to adding a new user. The admin users can update, delete, or suspend any regular users within the organization. Admin users can be updated, deleted, or suspended by the main admin account. The main admin account can be edited by a representative of a company that administers the software system.

User Electronic Signature:

Upon entering a user into the software system, an electronic signature can be uploaded for that user. The system is able to save the signature for a specific member so signatures are always associated with a specific login. The user is therefore able to insert their electronic signature in any document they generate on the software system. This feature was originally designed for the user to insert their signature during the creation of letters to external sources which may be contacted as part of an applicant's background investigation process.

Figure 35:
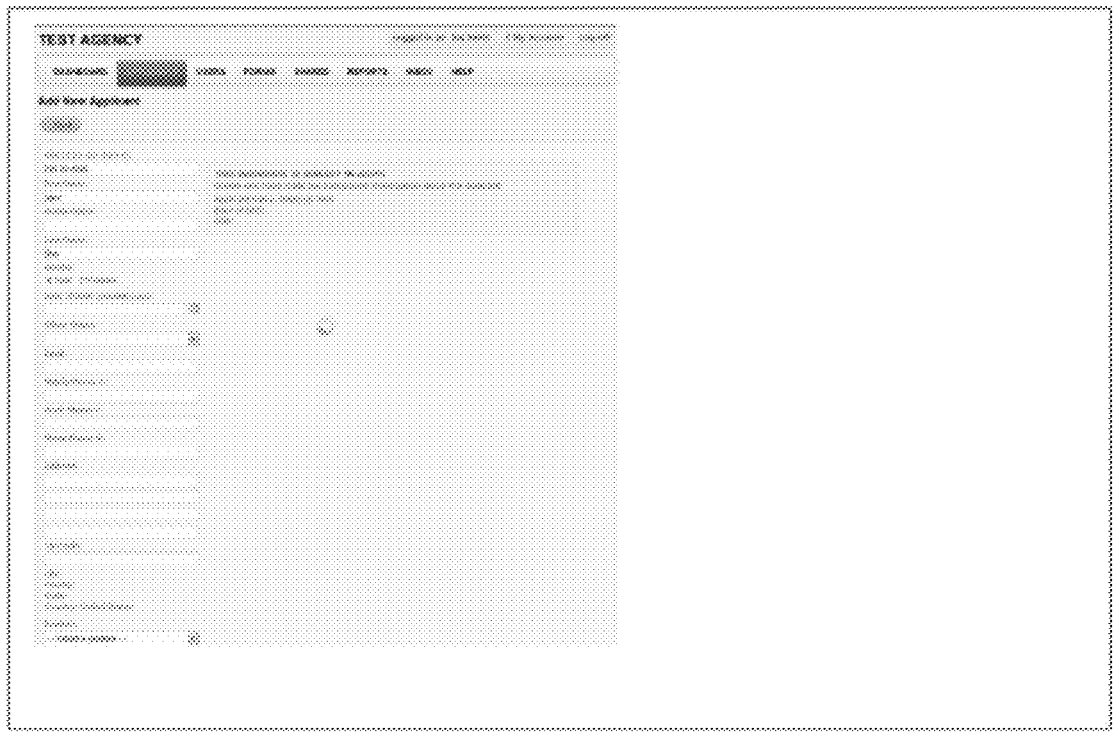
FIG. 35 is a screen display of a page to allow entering applicant's into the account on the system.
Figure 36:
FIG. 36 is a screen display of a page to assign applicant entries into different categories such as Pending Assignment, Assigned, Suspended and Completed.

Entering Applicants:

(FIGS. 35, 36) Any user at an organization can enter new applicants into the software system. To do this, the user clicks on "Applicants" and then clicks a button that functions to bring up various fields which are required to enter a new applicant into the system (Such as names, date of birth, social security number, address, phone numbers, position applying for, etc). Upon entering the applicant's name and other information into the system, the system performs a check of the central computer (server) to see if the applicant has previously been entered by any other organization on the software system. If the system finds a match, the system produces information including the other agency's information (name, contact info, point of contact, etc.), and also what position the applicant applied for and a brief summary of the applicant's current status with the agency. When an applicant is entered into the system, the applicant is suitably put in a Pending Assignment status or assigned to one of the User's at the organization. When assigned to a user, the user will receive an alert to their dashboard inbox and their external email (if activated).

Managing Applicants:

(FIGS. 36, 37) Each user at an organization can view the status of applicants the agency has entered into the software system via their user dashboard. The applicants are presented by their current status, including applicants that are: "Pending Assignment" (entered into the software system but pending assignment to an organization's user for investigation), "Assigned" (currently assigned to a user at the organization), "Suspended" (a user at the organization as temporarily suspended the investigation), "Completed" (the applicant's background investigation has been completed by the organization).

Applicant Status:

(FIGS. 36, 37, 50, 51) Applicant's status is always displayed on their Applicant Profile where applicants are displayed in the system. Statuses include, but are not limited to: Pending Assignment, Assigned, Suspended, Completed, Hired, Conditional Job Offer, Admin Review, Not Selected—eligible to reapply, Not selected—ineligible to reapply, Appeal, Reopened.

Any user at an organization can access the list of applicants from the users dashboard view and update the status of an applicant. The status can also be updated from an organization user accessing the Applicant's Profile.

Figure 52:
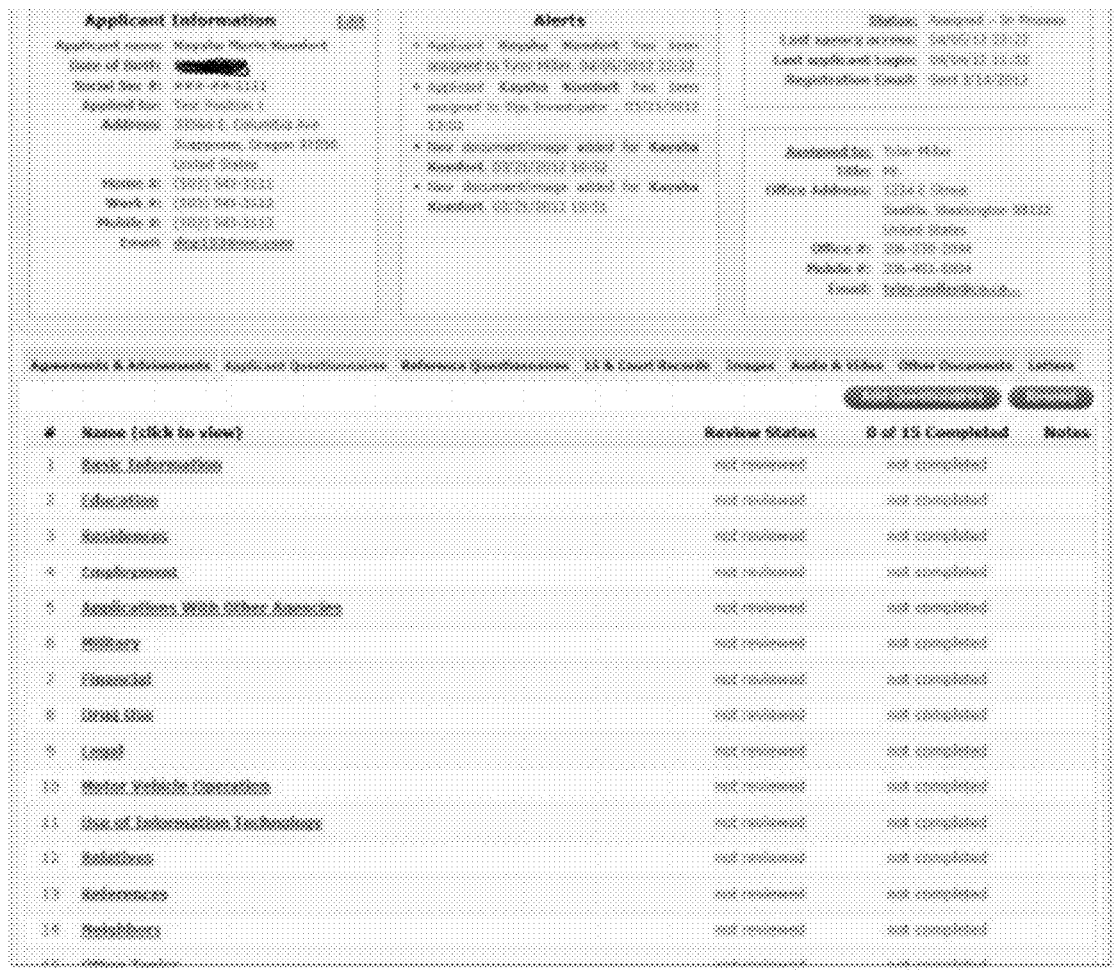

Investigation Management:

(FIG. 52) Users can access an Applicant's Profile and view the status of the investigation by checking the files within the Applicant's Profile. One file contains the questionnaires and forms the applicant has been assigned by the organization to complete. When an applicant completes one questionnaire, the organization's user can see the date and time it was completed.

Positions:

(FIGS. 39, 40, 41) Organization users can create positions they conduct background investigations for within their organizations. This feature allows the organization users to select Agreements and Advisements, questionnaires, and other documents specific for a position to be saved under a position name. For example, these documents could be selected for the "Confidential Secretary" position. When a new applicant is entered into the software system for the first time, this feature allows expedited assignment of requirements (documents, etc) for that position by simply assigning the position name to the newly entered applicant, opposed to having to select each individual document for the applicant to complete; requirements are saved under the position!

Figure 42:
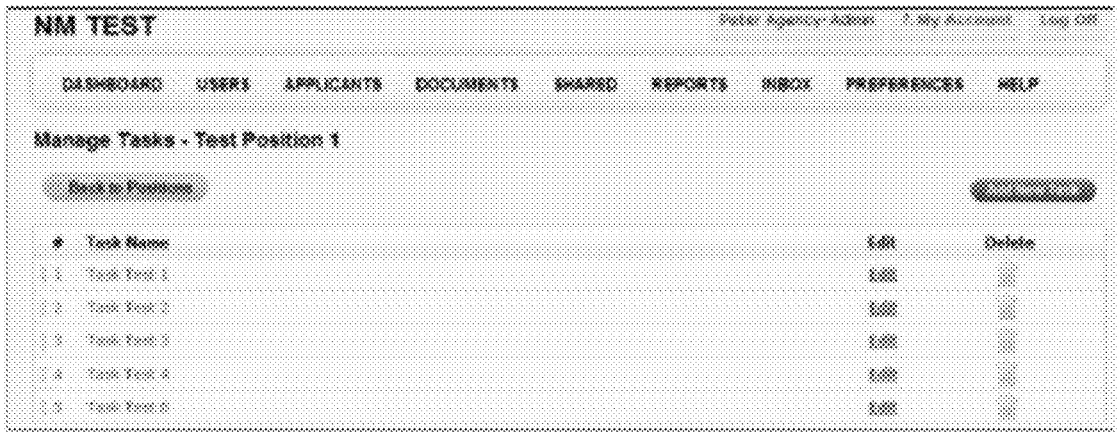
FIG. 42 is a screen display of a page to allow the creation and edit of a task checklist related to a position within an account.
Figure 53:
Figure 54:
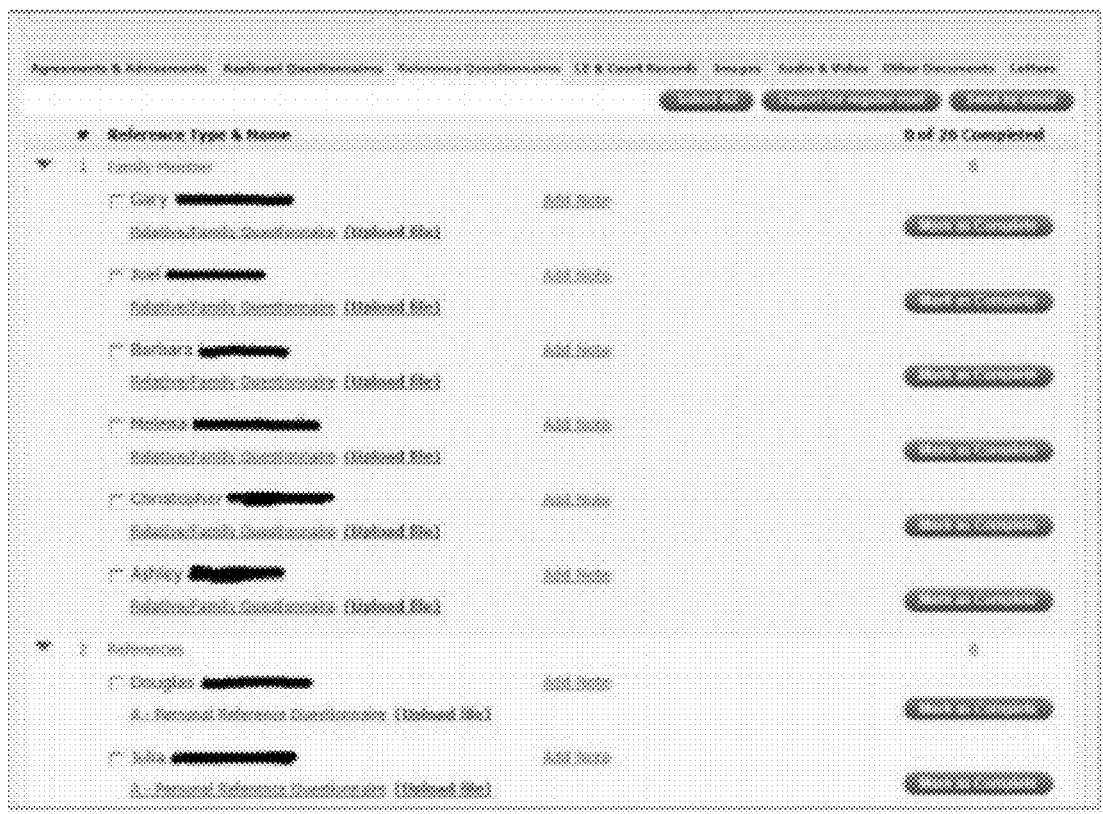
Figure 55:
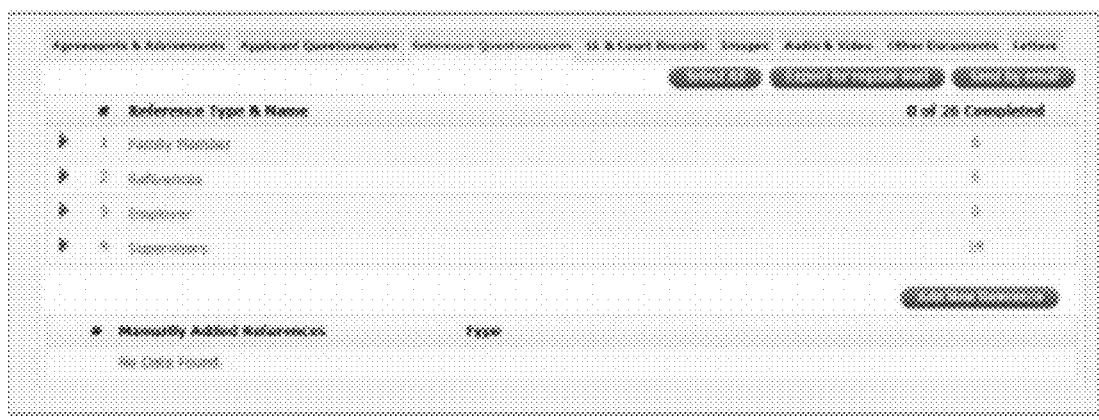

Checklists:

(FIGS. 42, 53) Checklists is a feature in the software system which allows organization users to establish a check off list of tasks/duties associated with each applicant's background investigation, based on the position. This checklist feature is to ensure the organization user (background investigator) is completing each and every task or duty required by management or supervisors for the type of position the applicant has applied for. This ensures no steps are missed in an applicant's background investigation.

Figure 20:
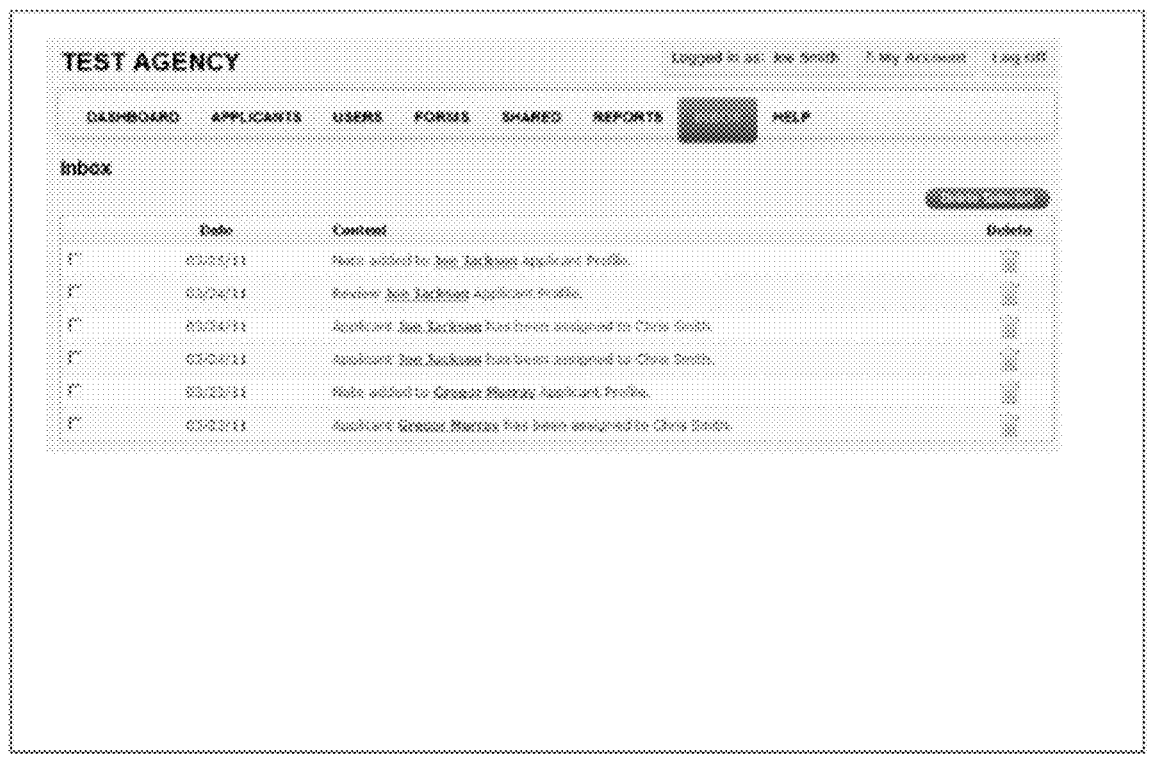
FIG. 20 is a screen display of an inbox feature showing a user their messages and alerts received related to applicants assigned, or messages received with edit functionality.
Figure 22:
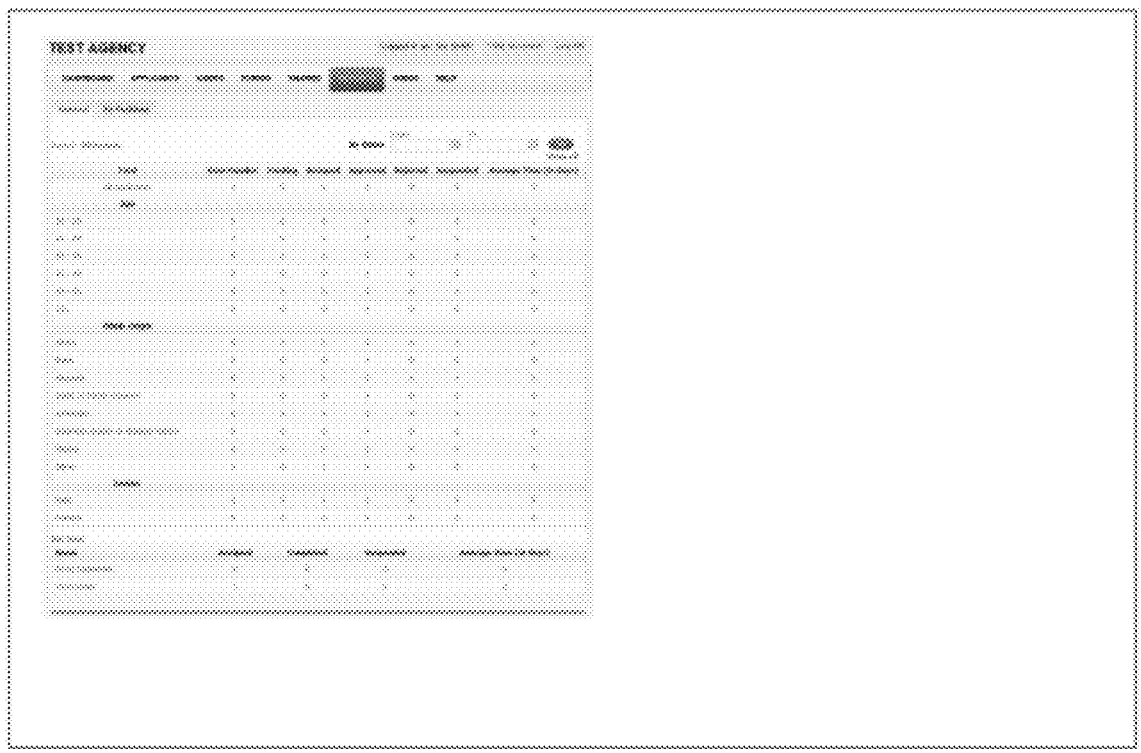
FIG. 22 is a screen display of "General" data the system may generate based on other data and use within an account.
Figure 23:
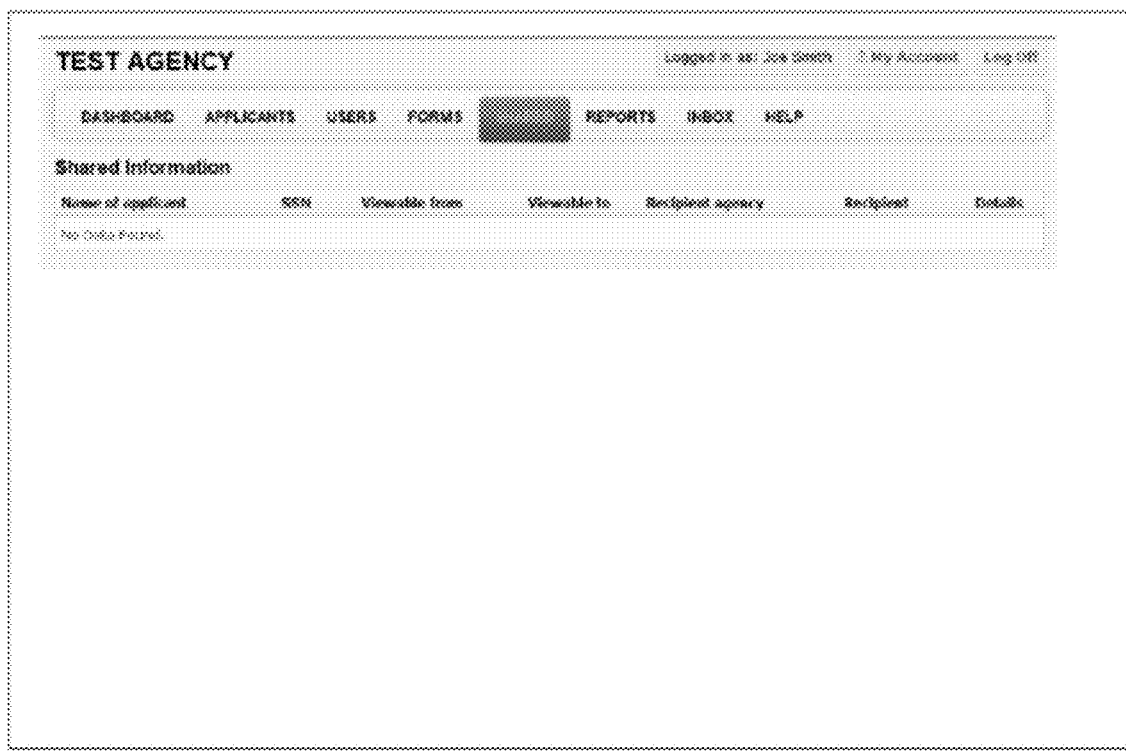
FIG. 23 is a screen display that shows a record of "shared" information and related information such as SSN, Viewable dates, Recipient, and other a link to additional details.
Figure 24:
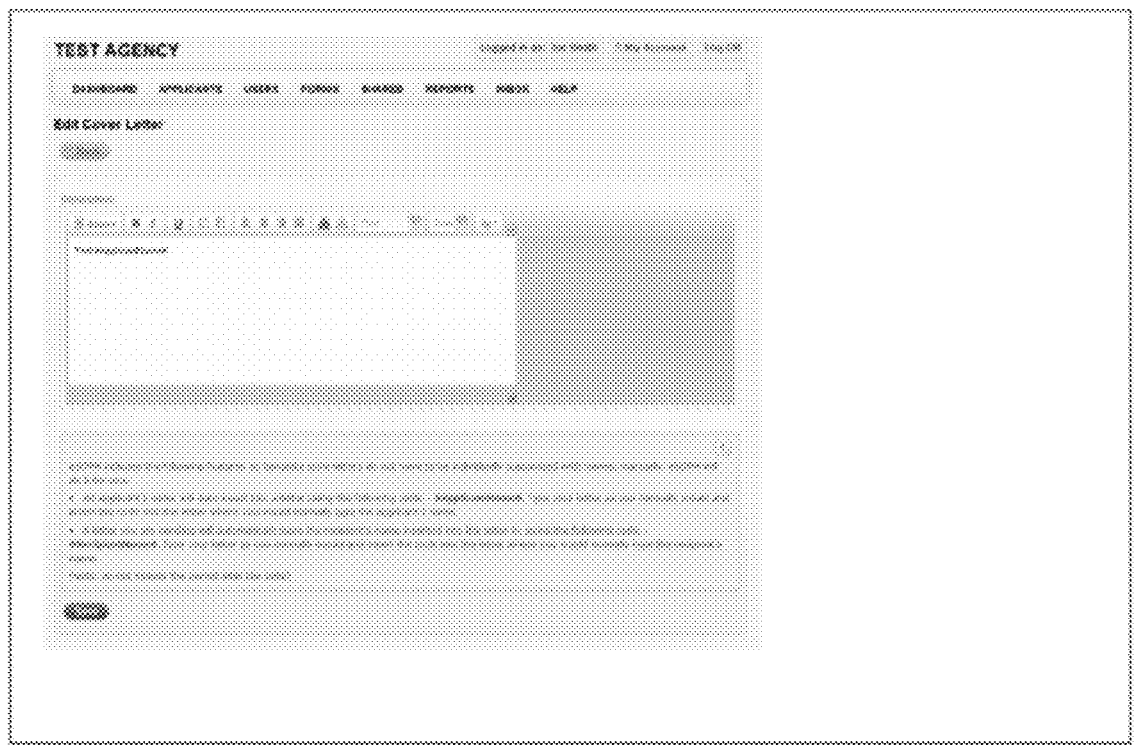
FIG. 24 is a screen display showing a page to generate template letters with HTML and other codes that the agency uses to send to applicants.
Figure 25:
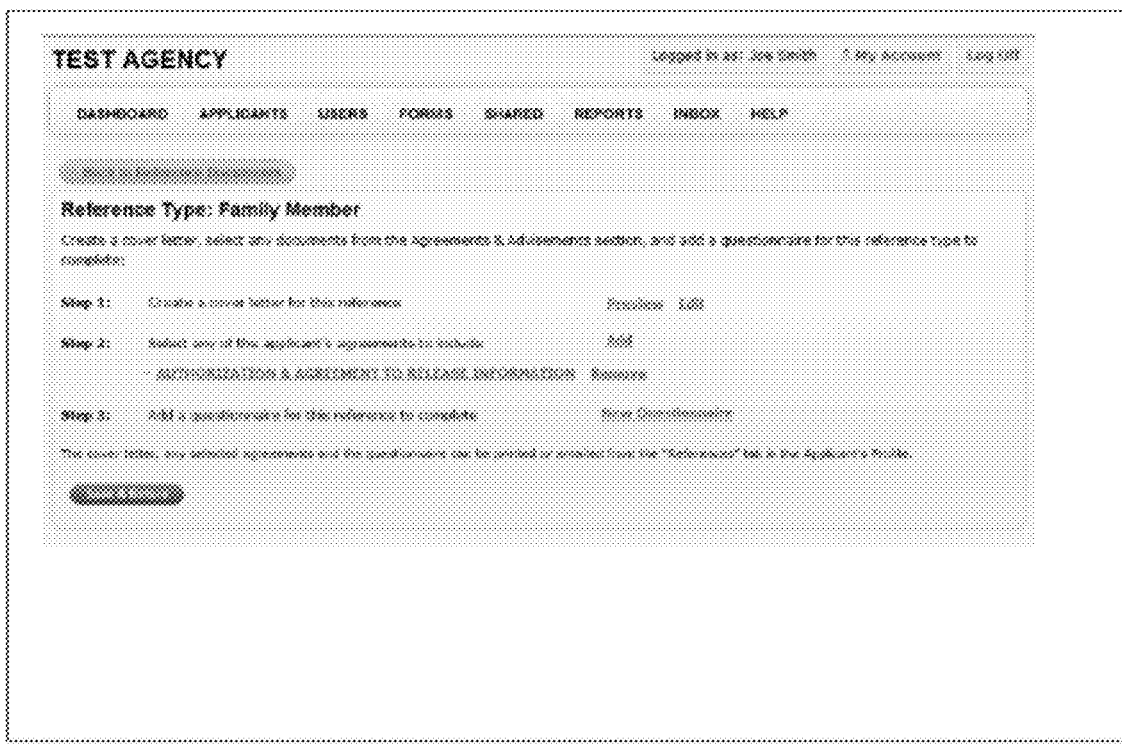
FIG. 25 is a screen display showing a page where documents can be associated with a certain type of reference.
Figure 26:
FIG. 26 is a screen display showing different reference types the system supports.
Figure 27:
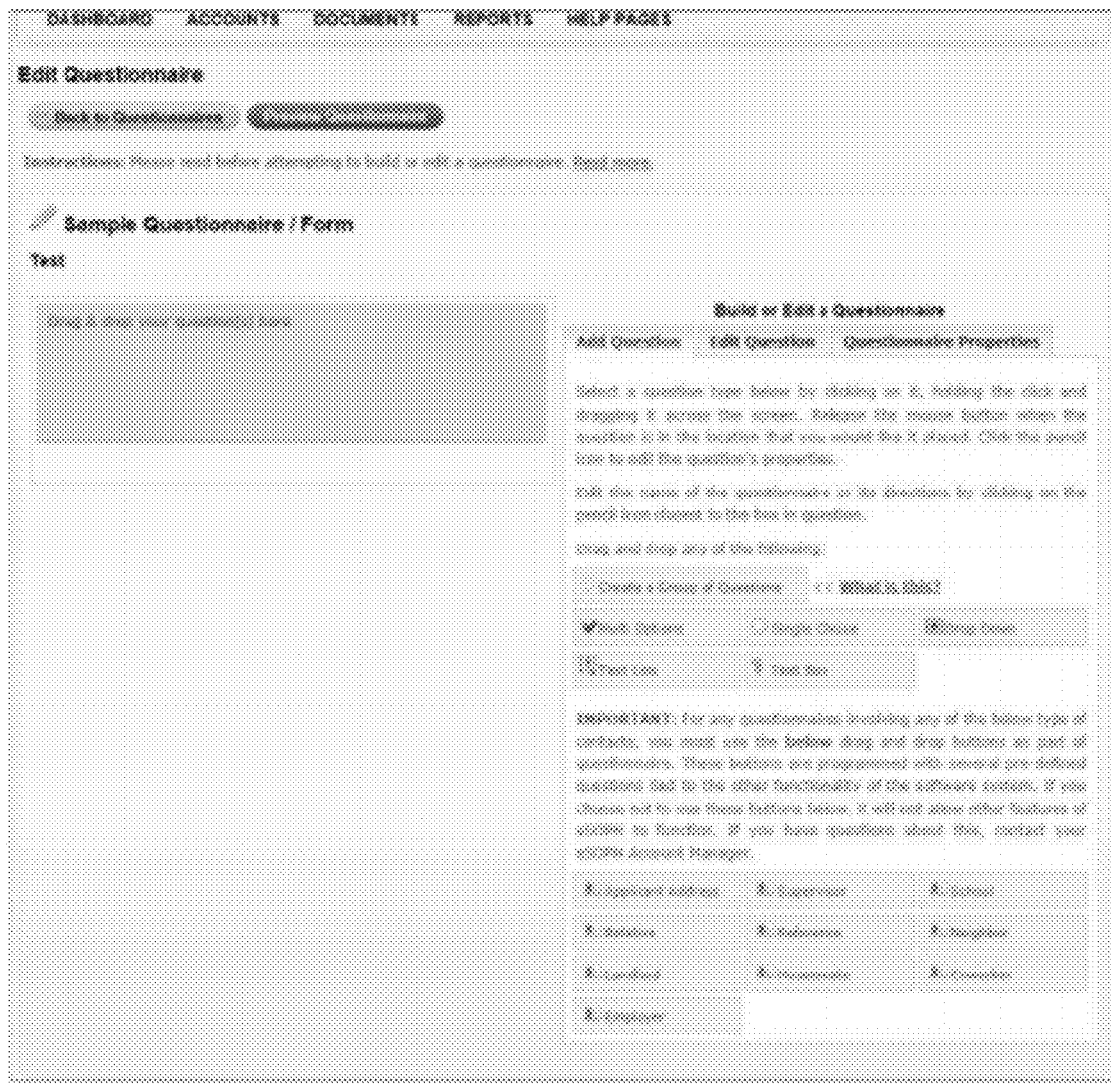
FIG. 27 is a screen display showing a page where questionnaires and forms can be built or edited for use with applicants.
Figure 28:
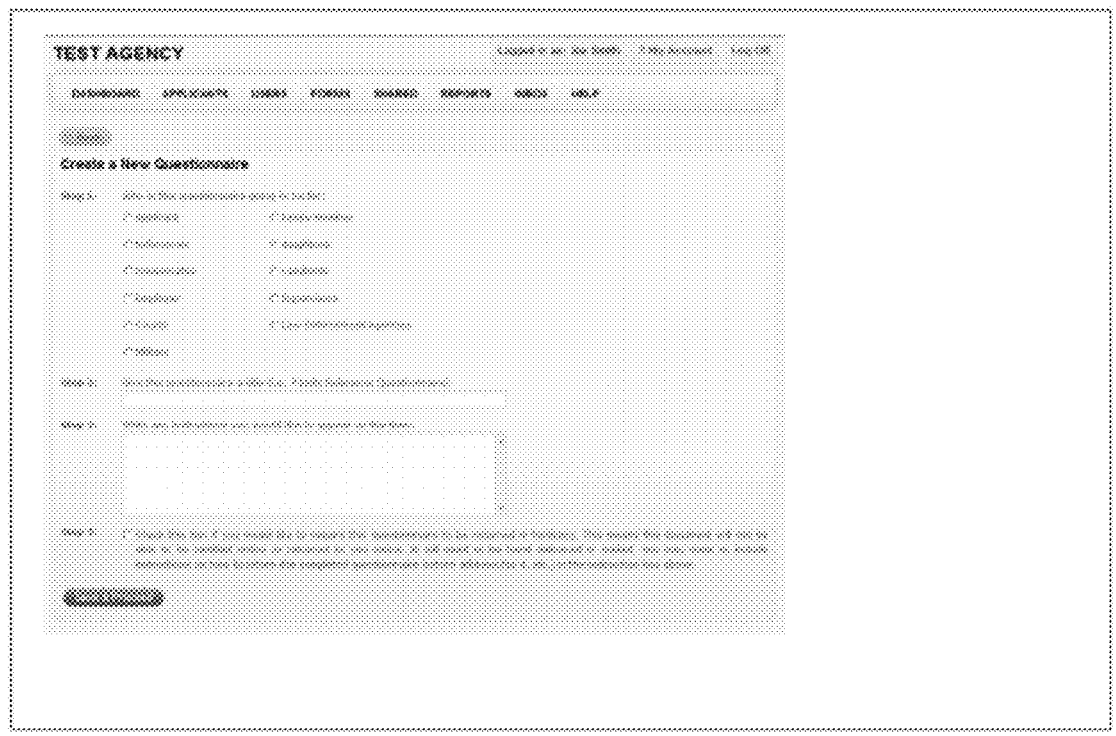
FIG. 28 is a screen display showing the initial properties setup of a new questionnaire/form.
Figure 30:
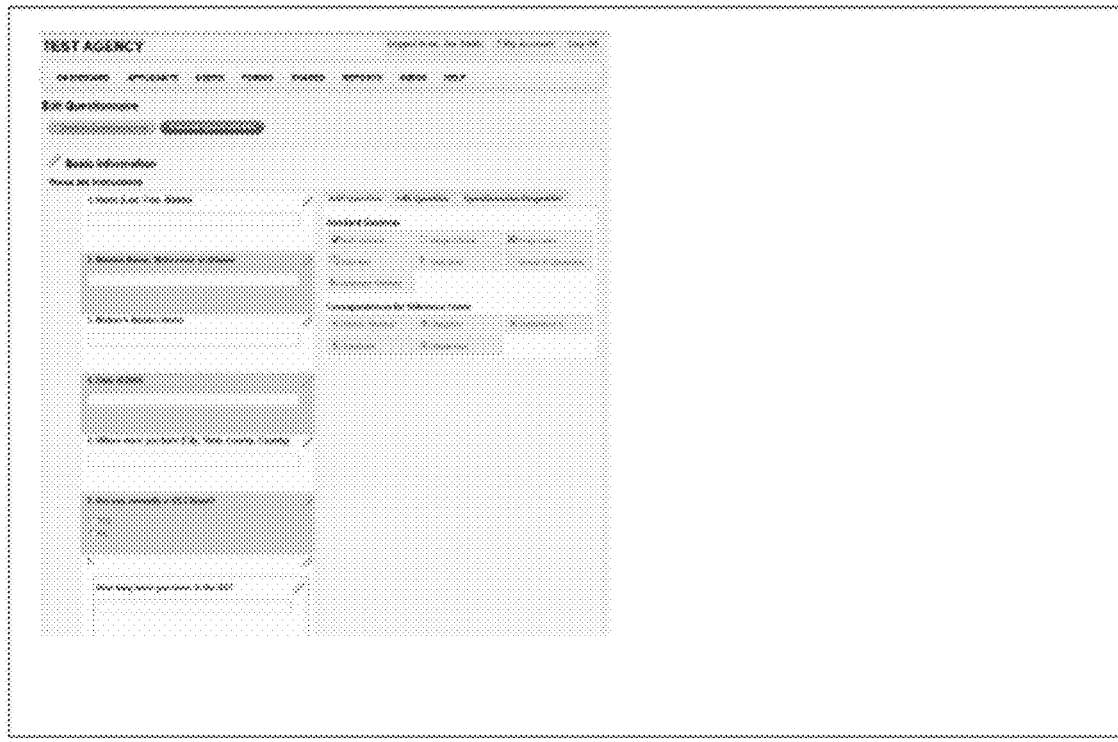
FIG. 30 is a screen display showing a page for building questionnaires using drag and drop functionality.
Figure 31:
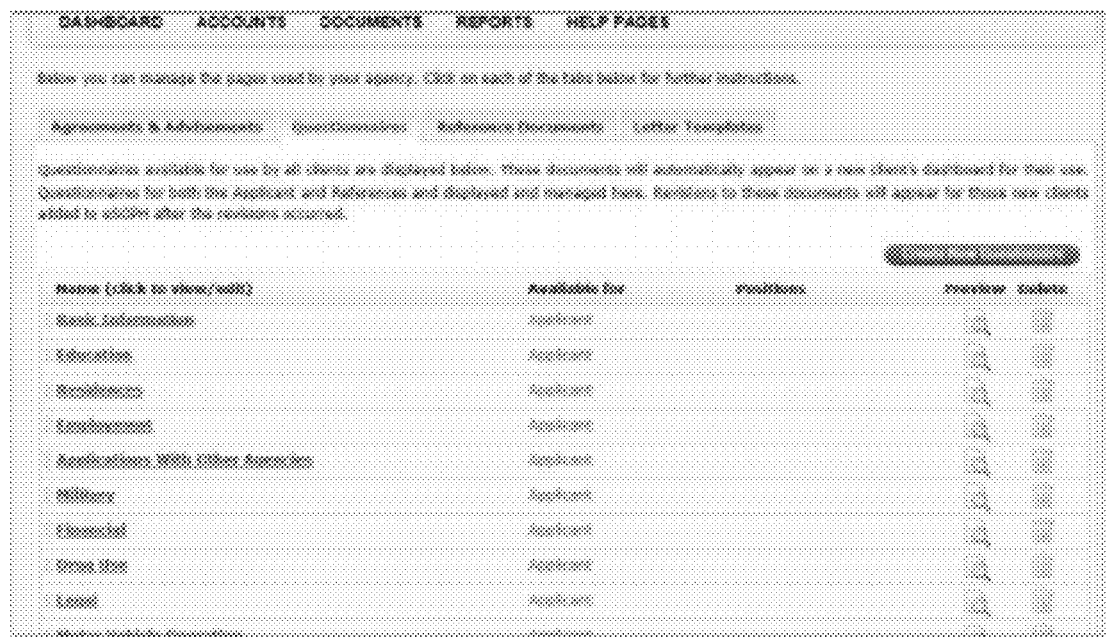
FIG. 31 is a screen display of questionnaires in an account with certain functionality associated to them such as edit, preview and delete.
Figure 32:
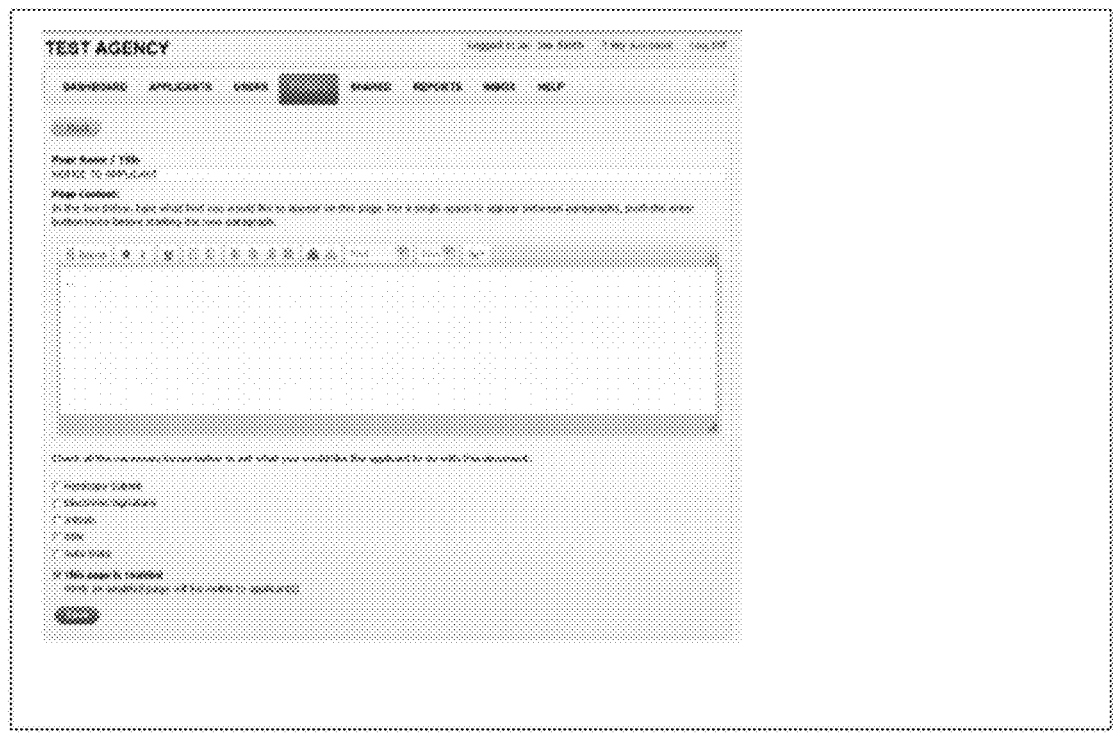
FIG. 32 is another screen display of a document in edit mode where an agency can write certain content and select how the applicant acknowledges it.
Figure 33:
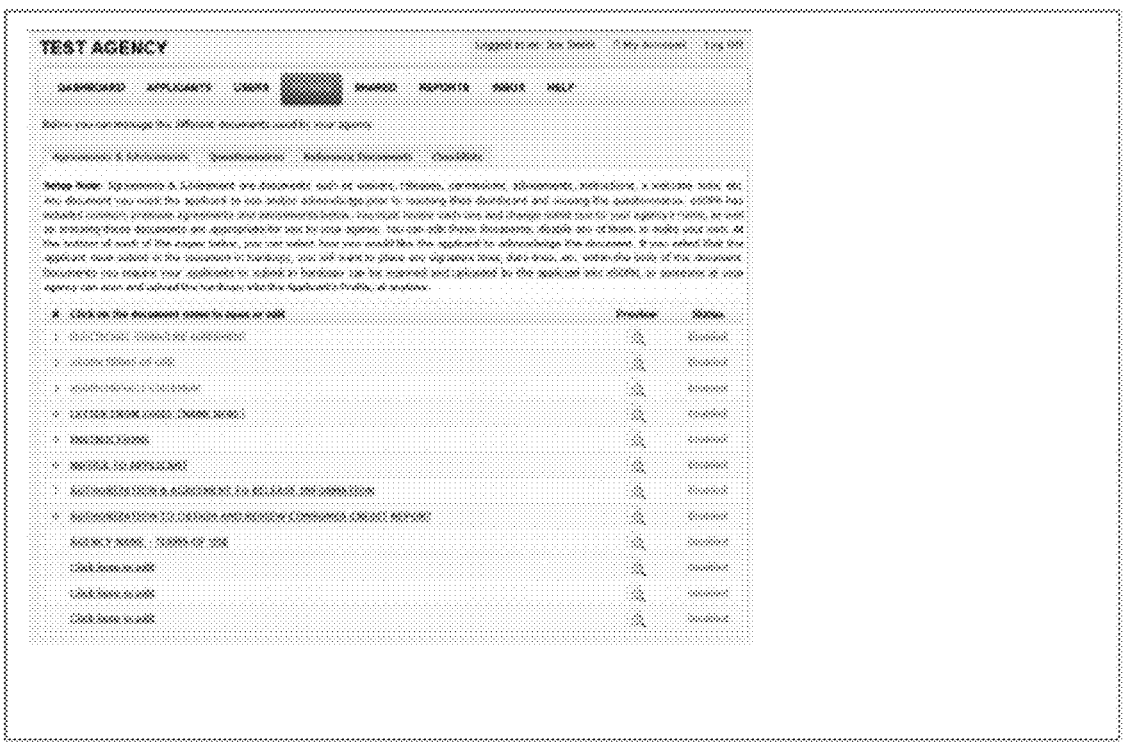
FIG. 33 is a screen display of a page where different types of documents can be managed from with a display of their title, status and preview option.

Alerts:

(FIGS. 20, 37, 50) When an applicant is assigned to a user at the organization, that user is able to select if they would like to receive alerts regarding activity relating to the applicant from the software system. Alerts include: an alert showing date and time an applicant logged into the software system, when the applicant has completed certain documents or other requirements assigned to them, when a reference returns a questionnaire, when a note is added to an assigned applicant's profile, and when an applicant is assigned to a user at the organization.

An alert is also sent to the user at the organization if another, separate organization enters the applicant into the software system, as long as the first organization has not yet completed the applicant's investigation.

Reference Management:

(FIGS. 3, 4, 25, 54, 55) The software system uses the names, addresses, email addresses and phone numbers applicants supply from the questionnaires in the software system to build a reference file within the Applicant's Profile. Here, the system displays reference sources (names and info) to include relatives, employers, supervisors, co-workers, neighbors, and personal references. The software system allows the user at an organization to access this file and print a cover letter, a questionnaire, and select any Agreements and Advisement to include, which will print grouped together and be addressed to the correct reference. A second print button will also print the address on envelopes.

If an email address was provided for a reference source, the organization's user can select how to mail the reference documents to the individual (by email, or by mail, or by both). If by email, the reference receives an email with a link to log into the software system. Here the reference is presented with the documents the organization has selected them to see and complete. When the reference is done, they can save the questionnaire and come back to it later to add more info, or they can send it back to the organization. When the reference has submitted their documents, the user assigned to the applicant's background investigation at the organization receives an alert.

The content of documents sent to references is controllable by the organization's user through the Forms page, and through the Reference Documents file within an Applicant's Profile.

An organization user can add notes under any reference name within this file. This is helpful if the organization user has to contact the reference by phone. The user can take notes as they speak to the reference source on the phone.

The organization user can also add a new reference (name, address, email, phone numbers, relationship, etc.) to the file that was not included in the applicant's Reponses.

Mailed or emailed references can be programmed so that if a reference is not received back within a set amount of time (Days), the system prompts an alert to the organization user assigned to the investigation indicating no response received for the specific reference. A "Resend" button appears (for email references), "Dismiss," or a set a new flag, which allows the user to set a new date and time to remind the user about the reference at a later time. The organization's admin account sets the number of days that have to pass before an alert flag is produced to the assigned user at the organization who is conducting the investigation, for the first flag.

Inbox:

(FIG. 20) Each software system user (including applicants) has an inbox on their user dashboard. This inbox collects the incoming alerts and messages related to each user and displays them to the user in an inbox section on the user's dashboard, and through an inbox page, which is accessible via a link in the dashboard's inbox or via the main menu bar.

Messaging System:

An investigator can send a message to an applicant or any of the organization's users by clicking a "Compose Message" button and selecting the name of the user or applicant on the software system. If an organization's user accesses an applicant's profile and then clicks a "send message" or similarly named button, the message will be sent to that applicant and the message is added to a "messages" folder within the applicant's profile. When a message is opened by an applicant, it is noted next to the actual message in the Organization's user's sent mail folder. The purpose of the messages folder is so that any hiring authority conducting a review of the investigation can look back over communication between the applicant and the organization's user(s). It also helps to create an official, undisputable record of communication between the applicant and organization users.

Figure 43:
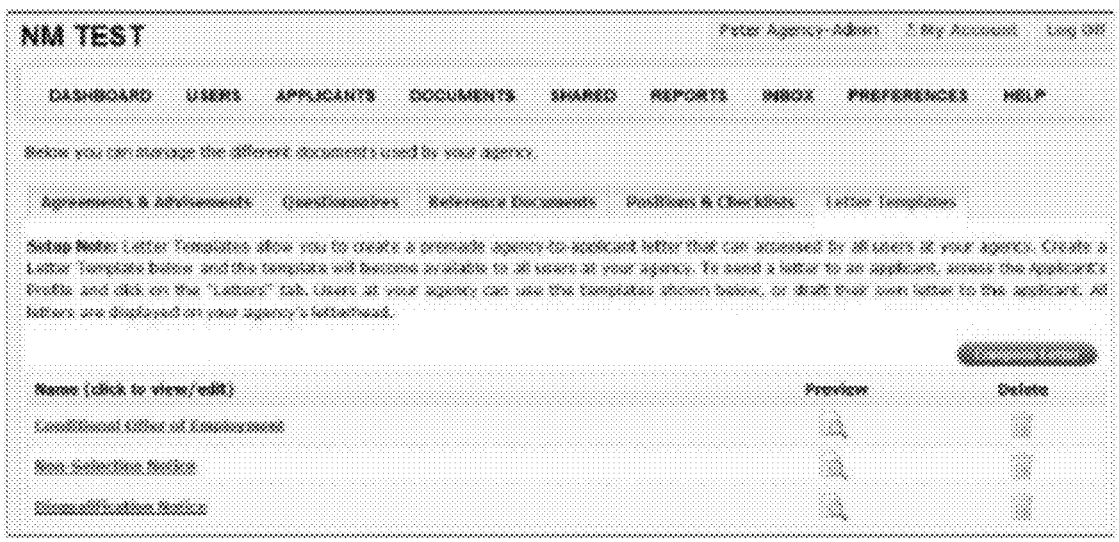
FIG. 43 is a screen display of the system's functionality to allow the creation and management of saved/letter templates which can be used by any agency user of the system after created.
Figure 44:
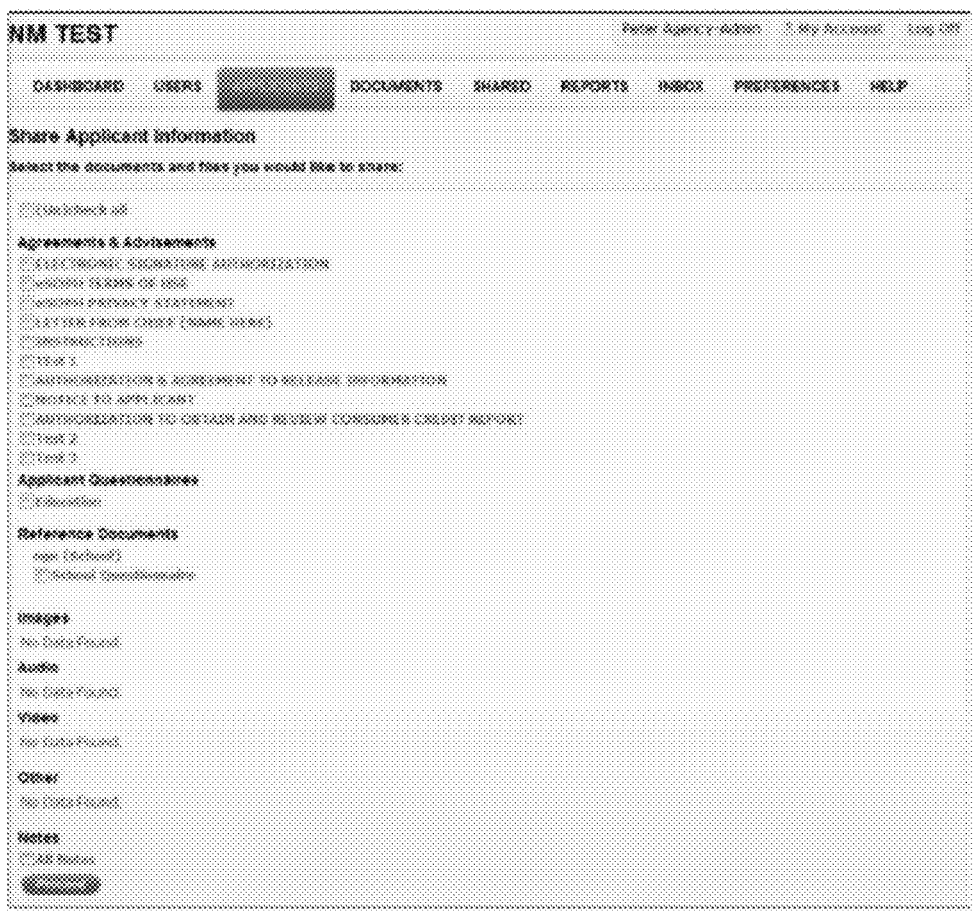
FIG. 44 is a screen display of the system's functionality to allow a user to select information from an applicant's profile to be viewable to an invited external individual.
Figure 46:
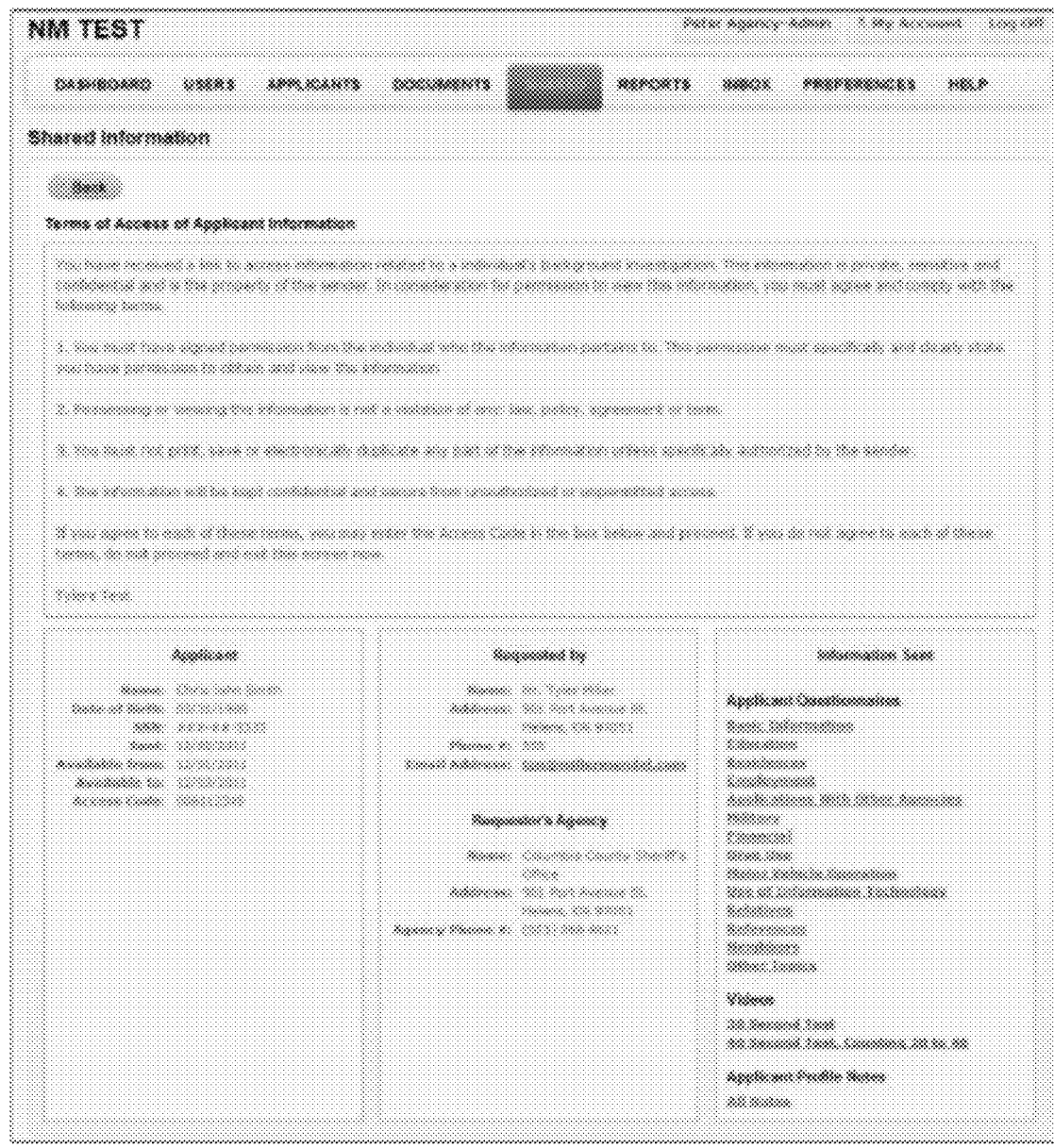
FIG. 46 is a screen display of the system's functionality to reproduce detailed information on previous detail of shared information.
Figure 47:
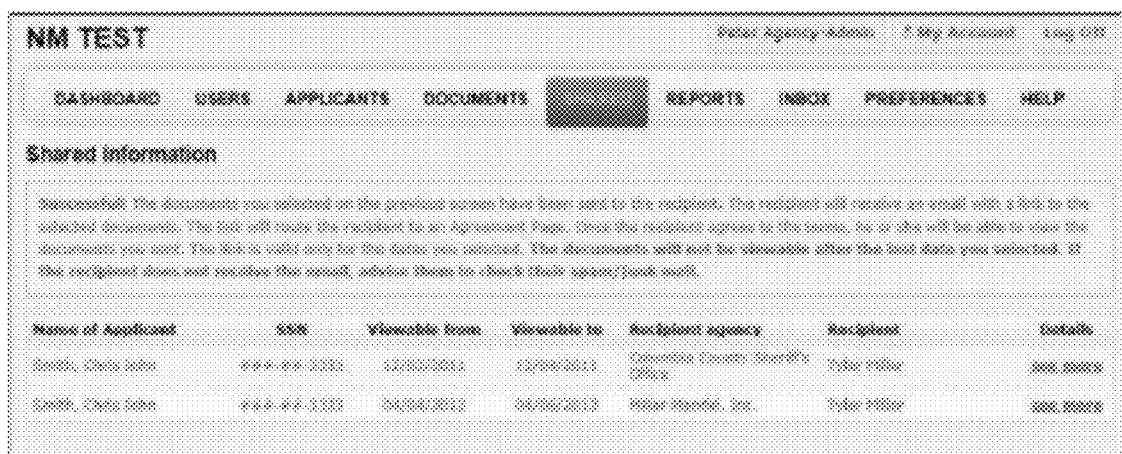
FIG. 47 is a screen display of the system's functionality to produce basic information on previous, certain detail of shared information
Figure 48:
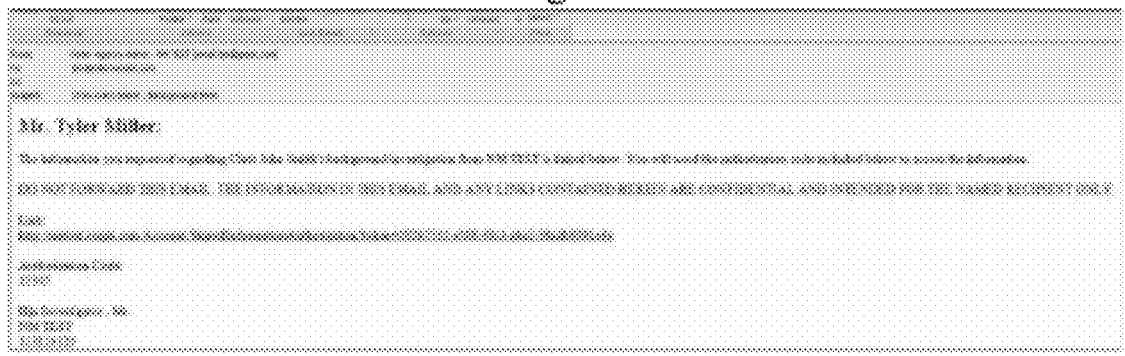
FIG. 48 is a screen display of the system's functionality to send a link and other content via email notifying a third party of their invitation to view information they had requested about an applicant.
Figure 49:
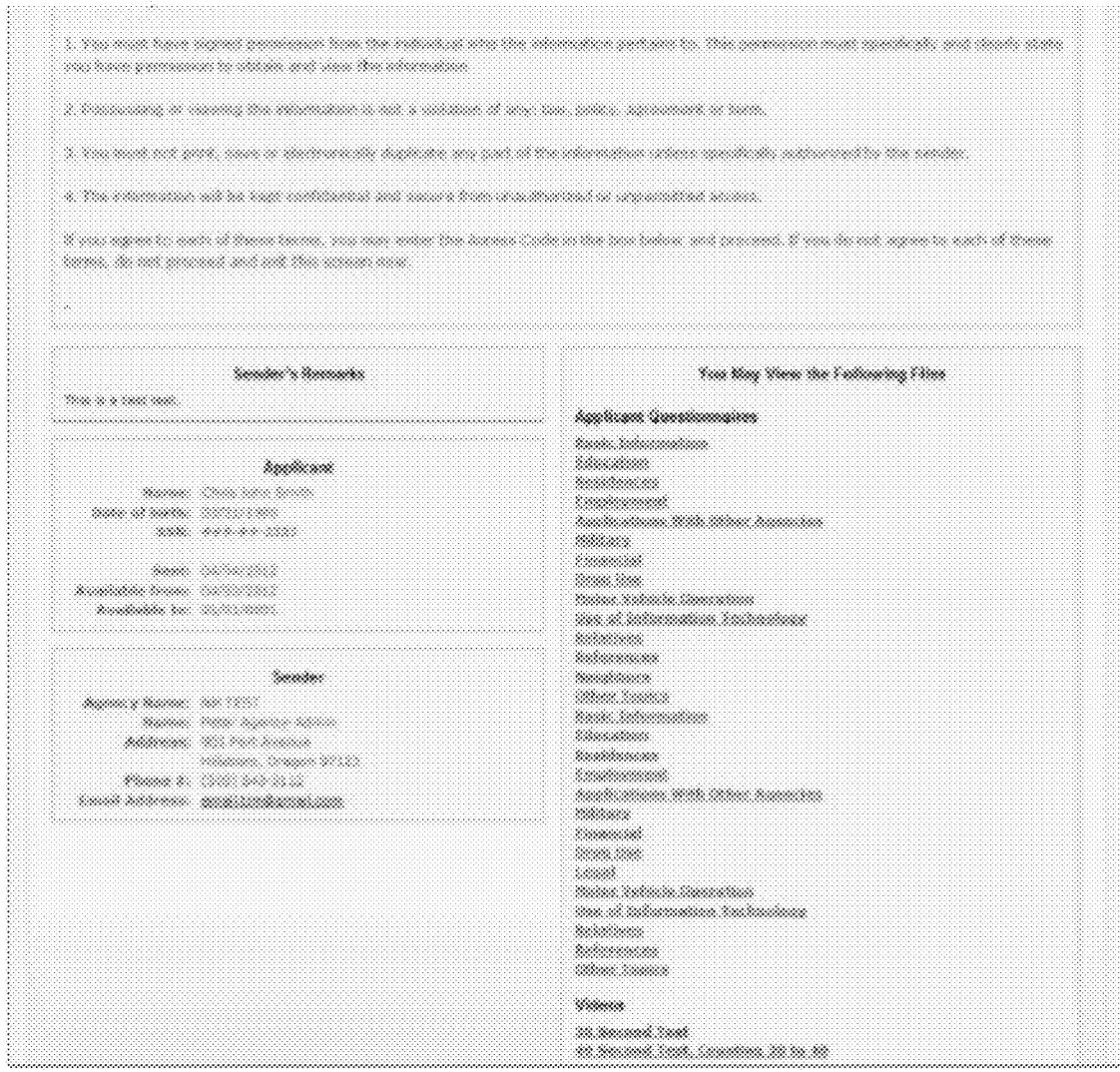
FIG. 49 is a screen display of the system's functionality to display selected information to the recipient who has given access to such information by the sending agency.
Figure 56:
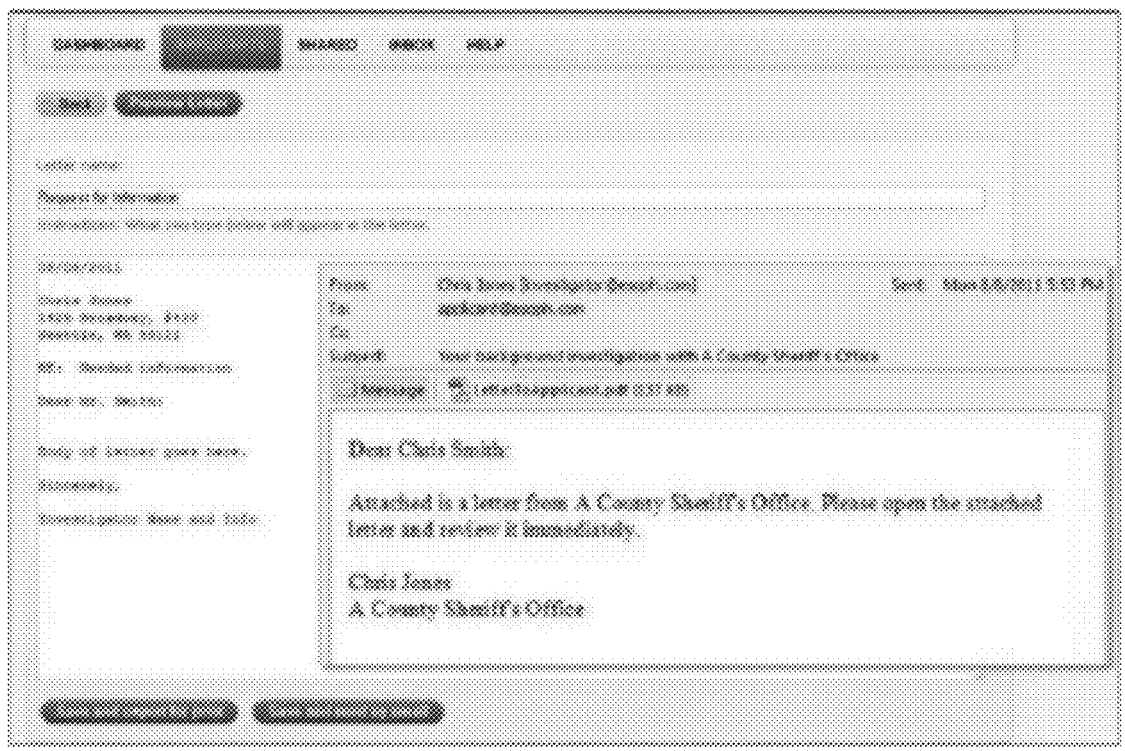

Organization To Applicant Letter:

(FIGS. 43, 56) A feature of the software system allows a user at the organization to send an official letter to the applicant (more formal then the email type messaging listed above). This letter appears on the organization's pre-loaded letter head. The system allows the letterhead to be sent electronically through the system to the applicant, or printed, with an envelope, and mail to the applicant. If sent electronically, the system notifies the applicant on their dashboard the letter was received in the inbox (or via the inbox page). The applicant can open and review the letter and print it, if they decide. An external notification about the letter is also sent to the applicant's external email address on file with the software system.

The system stores letters sent to the applicant in the Applicant's Profile in a designated file for any future reference.

Figure 57:
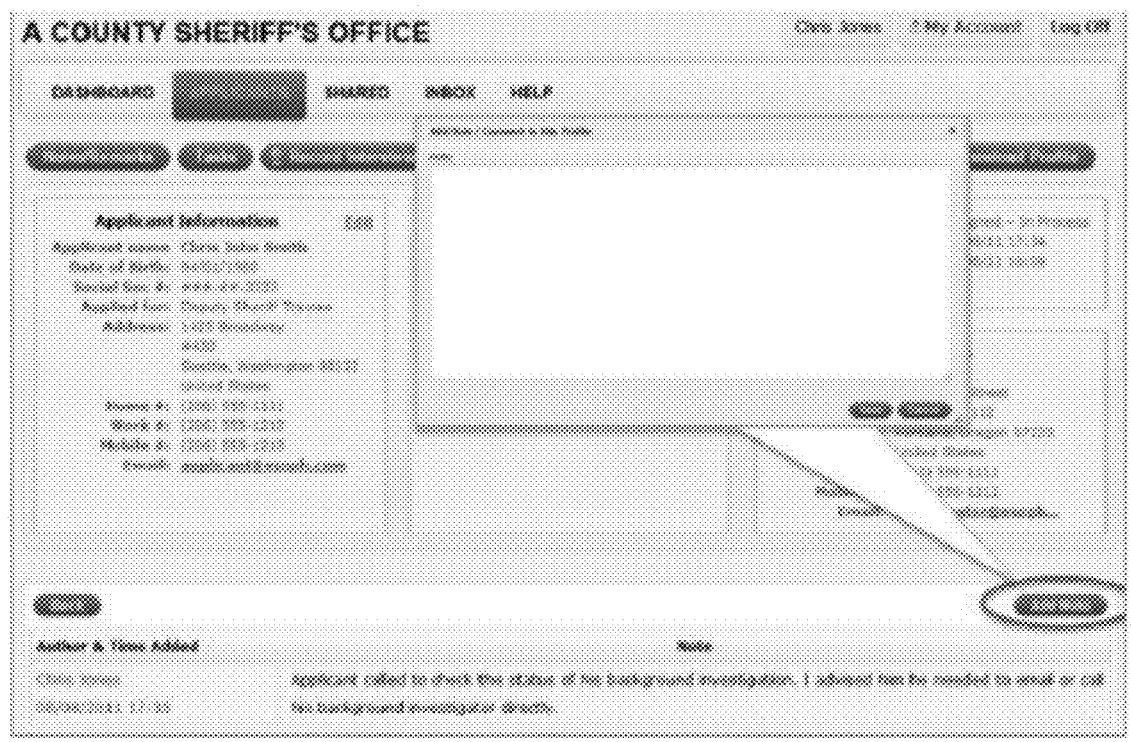

Electronic Notes:

(FIG. 57) The software system includes an electronic note section within each Applicant's Profile. Here, any organization user can type a note/comment which is related to the applicant. The note is stamped by the system with the date and time it was added, and the user's full name who added the note. When a note is added, the user at the organization who is assigned to the Applicant's background investigation receives an alert on their dashboard (and inbox page) and/or to external email address (if the user has External Notifications feature turned on/activated).

Figure 59:
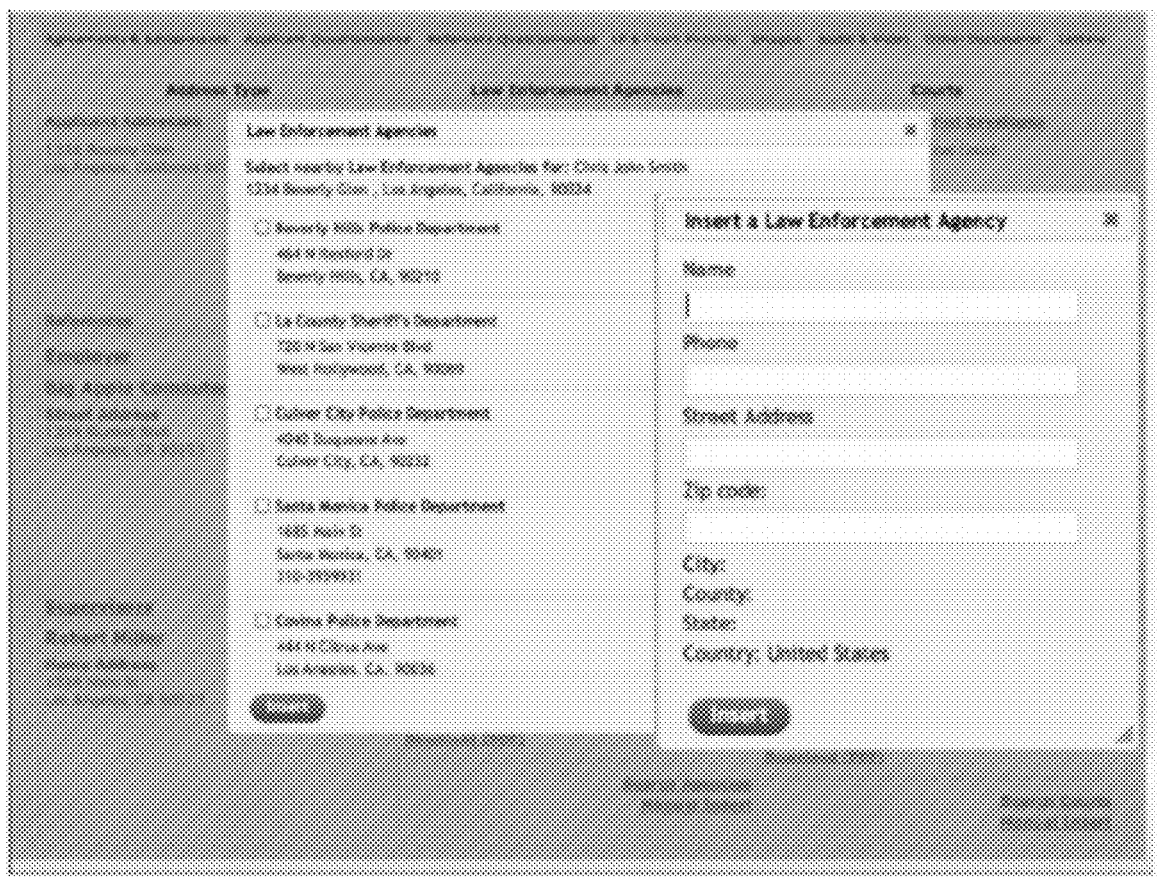

Address Locator:

(FIGS. 58, 59) The software system contains a feature that will retrieve law enforcement and court names, addresses and phone numbers for a pre-defined radius around the applicant's past and current addresses, and those addresses of the applicant's employer's and relatives.

The system does this by taking the address information the applicant provided on questionnaires he or she submitted to the organization via the software system. The system then conducts a search using an Internet search engine for agencies and courts around the selected address. A list of agencies and courts is presented to the user at which time the organization user selects which agencies and courts the organization will send reference letters and requests for records checks to. The user can also edit the address in case of any system mistake.

A print button next to each selected agency will print a cover letter to the agency, a questionnaire with questions for the agency or court to complete and any of the applicant's Agreements and Advisements that are selected to include in the mailing. A second print button will print the envelope for the agency or court. Both the cover letter and the envelope auto print with the correct name and address for the selected agencies and courts, individually, or a Print All feature will print selected with two clicks (one click for documents, one click for envelopes).

Document Upload:

(FIG. 13) The software system has a feature that allows a user to upload any hardcopy document into a specific location within an Applicant's Profile. The user does this by first logging into the software system, selecting the applicable applicant and then clicking on the location within the Applicant's profile where the document is to be uploaded. The software system allows the user to type information about the document such as its name, details, etc. The system also logs and displays the date and time the document was uploaded. If a document is uploaded to an Applicant's Profile, the user assigned to the applicant's investigation receives a notification on their dashboard (and inbox page), and an external notification to the email address on file in the software system for the particular user (if the external notification option is turned on/activated).

Figure 60:
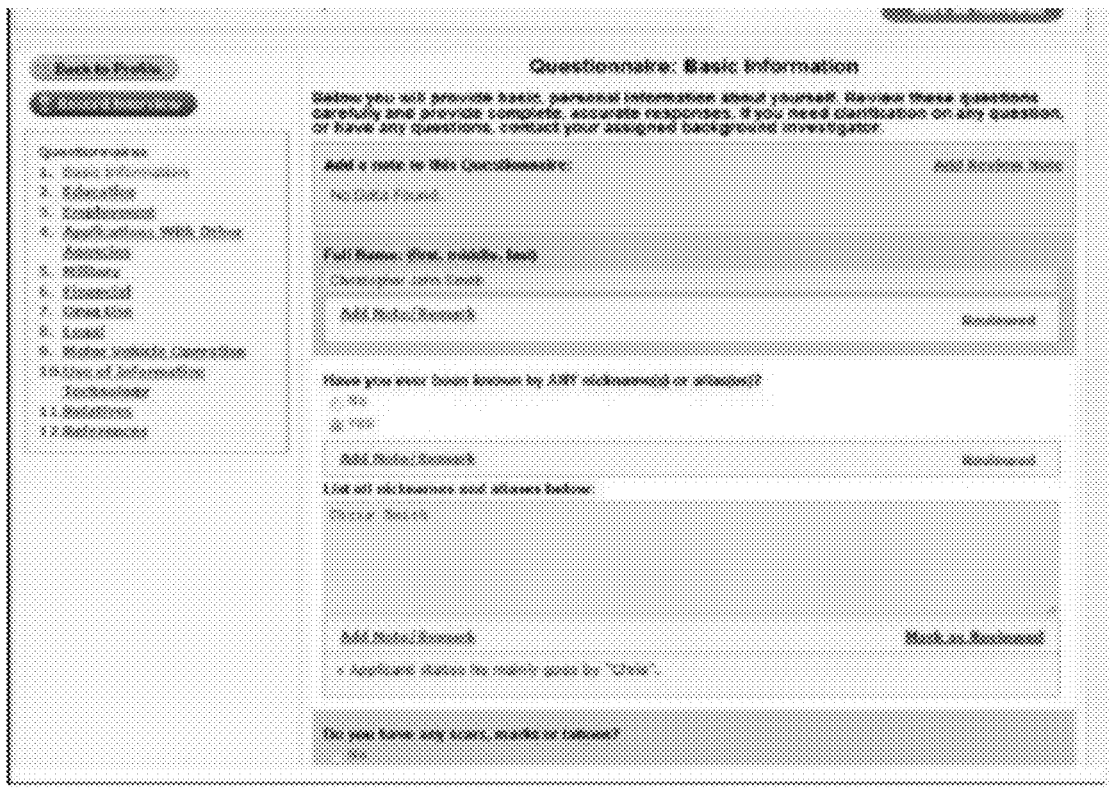

Answer Review:

(FIG. 60) Organization users can review an applicant's answers to questionnaires and other documents by accessing the applicant's profile, and clicking on the folder with the documents they wish to review. The organization user reviewing the documents can add a note to each of the applicant's Responses, which (the note) is viewable to the organization. As the organization user reviews each response in a document, the system allows a check off feature next to each question to ensure applicant responses are reviewed.

Figure 61:

Electronic Summary Report:

(FIG. 61) The software system allows the organization user conducting an applicant's background investigation to write a report when they have completed their investigation. This report is written inside a file within the Applicant's Profile and then saved. The system auto dates and time stamps the entry and also the name of the user writing the report.

Electronic Review:

(FIG. 51) The software system allows organization users to send an applicant's profile back and forth to one another for review and comment. This feature is designed to allow supervisors and managers the ability to receive a notification on their user dashboard and/or external email address that an Applicant Profile is ready for their review. The user can open the Applicant Profile, review information contained in the Applicant Profile and then note their recommendation within the Applicant Profile notes section, then route the Applicant Profile to another organization user within the software system, or send it to an external email address for review.

Information Sharing:

(FIGS. 44, 45, 46, 47, 48, 49) The software system contains a feature allowing organizations to select specific information from an Applicant's Profile to send to a third party. Upon selecting information from an individual's Applicant Profile, the organization's user is given a form to complete with the software system to include the name of the individual the information is being sent to, their organization's name, contact info, and a set a password that allows the information to be opened. A time frame can also be set to establish within what dates the information can be viewed.

The receiving individual receives an email with a link to the software system. Here, the receiving party is given a warning that the information they are receiving is confidential and can be accessed, viewed, or distributed in accordance with their agreement with the sender. If the receiver agrees to this, they enter the password the sender gave them to access the information. The system will then allow the receiving party to view the information the sender selected for them to view.

Export Information:

(FIGS. 13, 50, 62) Text information that is part of an Applicant's Profile is exportable to PDF, and therefore savable/printable by the organization on a drive of their choice. When the Applicant's Profile is accessed by the organization user, there is an Export feature/button that will export documents in the Applicant's Profile into a PDF file. Audio and/or video files can be exported by clicking on the file folder the desired files are in and downloading them to the source of the user's choice.

Re-Open an Investigation:

(FIG. 51) An applicant's investigation can be reopened by going to the Applicant's Profile and updating the status to Reopen or "Appeal." Either status will reopen the investigation so it can be assigned to a user at the organization for further processing per that organization's policy. Features noted herein are reactivated during a reopened investigation.

Flag an Applicant:

This feature allows organizations to create a flag on an applicant they have entered into the software system. The flag is used to note specific information about the applicant which the organization has deemed important for other organizations to know about. Other organizations can see the flag if they enter the same applicant into the software system.

Administrative Agency Account:

Each state has a state regulatory agency which generally oversees the standards for background investigations of law enforcement officers and other public safety related positions. Some of these agencies inspect organization's files to make sure their background files contain the required, on-file information about the applicant's background investigation. The Administrative Agency Account feature allows and Organization's admin account to create an "Administrative Agency Account," which gives an external user access to that organization's background files. The Administrative Agency Account is selectively limited for reviewing information for that specific organization during a specified time frame. The Agency Admin account at the organization has the ability to edit this account, including suspending it or deleting it.

Session Timeout:

The admin user at an organization can set the time for session time out timers for a user who is logged in to the software system. The set time will apply to users within that Organization's user group. The selectable time may be 1 to 120 minutes, or no session time out.

Admin Messages:

Users can send out message from the control panel/dashboard. These messages will go to every user on the system's inbox on their dashboard and inbox page. These messages will be used to announce enhancements or any message that is applicable for users on the software system to receive.

Organization List:

This feature is a button located on the dashboard and/or menu bar of each user (except applicant). If clicked, the system produces a list of agencies (who wish to be known) so the other organizations can see the network of users. This helps with information sharing.

Report a Problem:

This feature places a button on users' dashboard (except applicants). If clicked, it produces a form that can be completed to tell an admin about a problem the user encountered with the software system. Upon clicking send, the information is transmitted to admin personnel in the form of an email to any designated email address(es).

Account Manager:

(FIG. 37) This feature allows admin to input an account manager for each organization, which the information imputed displays on the dashboard of users at the organization. This information includes the account manager's name, phone numbers, and email address. This allows any organization user who is having problems a quick reference of who their account manager is and the ways to contact the account manager.

Figure 2:
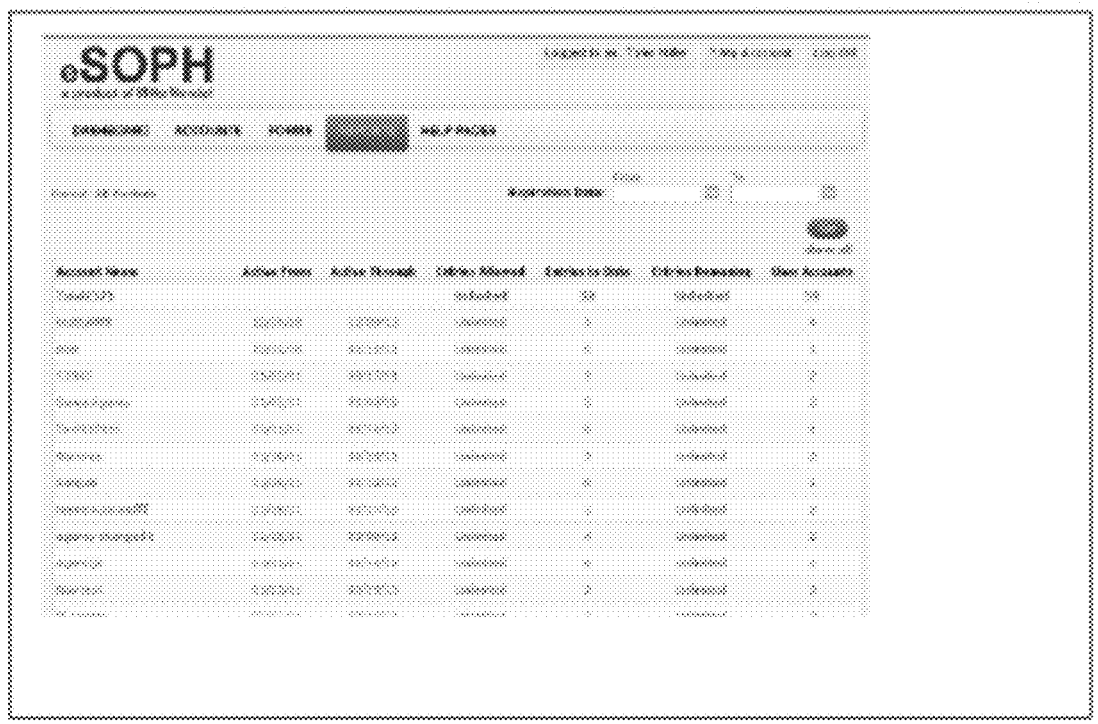
FIG. 2 is a screen display of an account information page.
Figure 3:
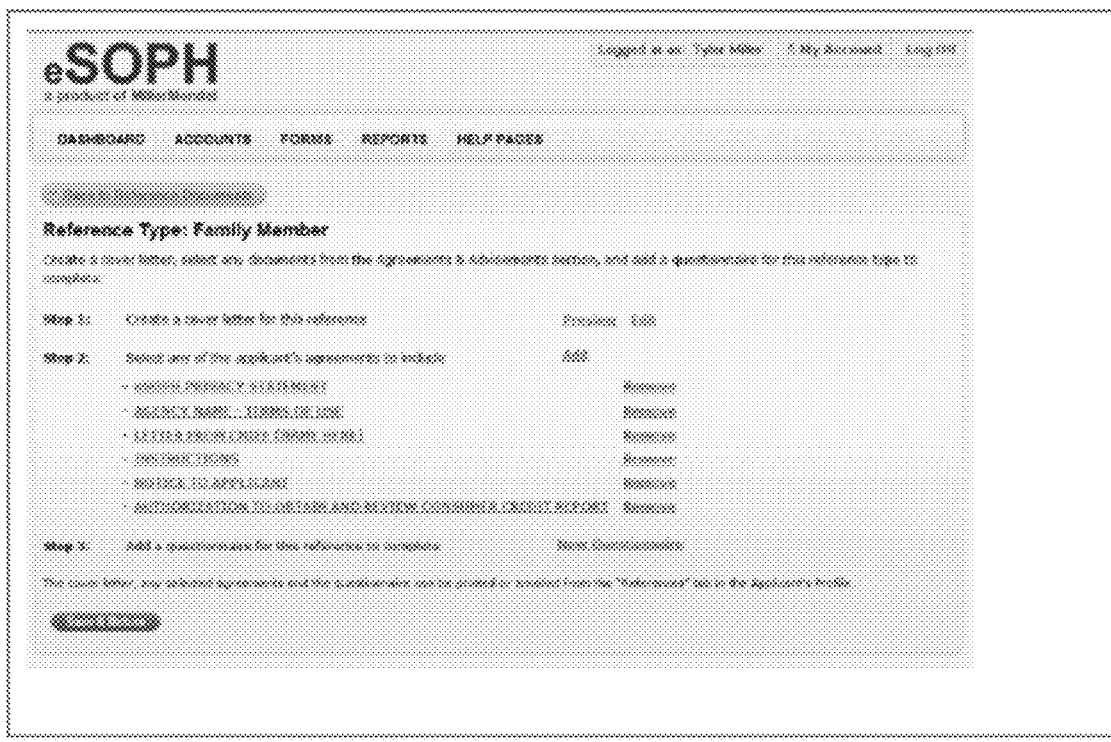
FIG. 3 is a screen display of a page on which content for a reference type is managed.
Figure 4:
FIG. 4 is a screen display showing different reference types that can be selected to manage associated content.
Figure 5:
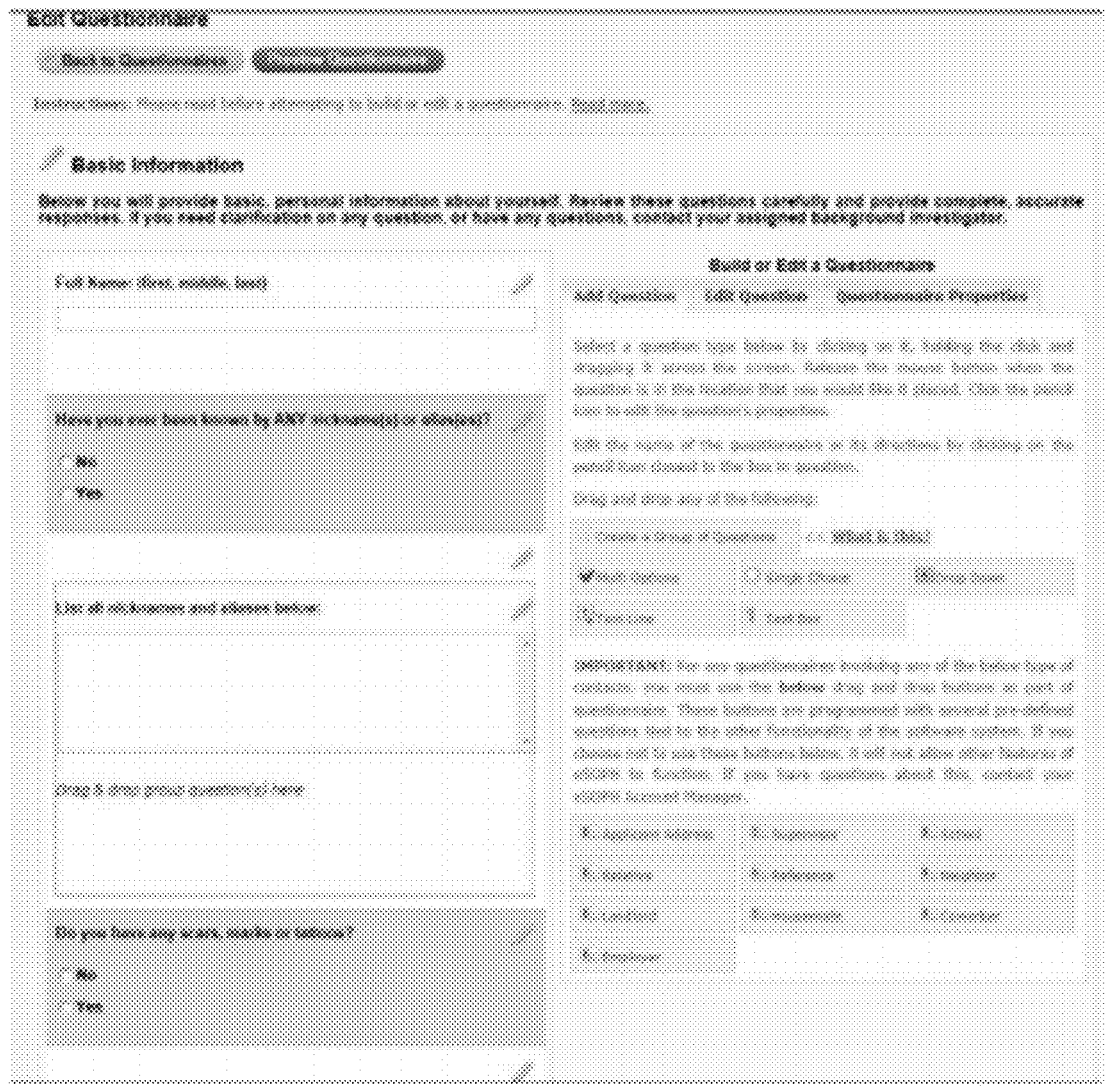
FIG. 5 is a screen display of an edit mode in building/editing questionnaires/forms within the system.
Figure 7:
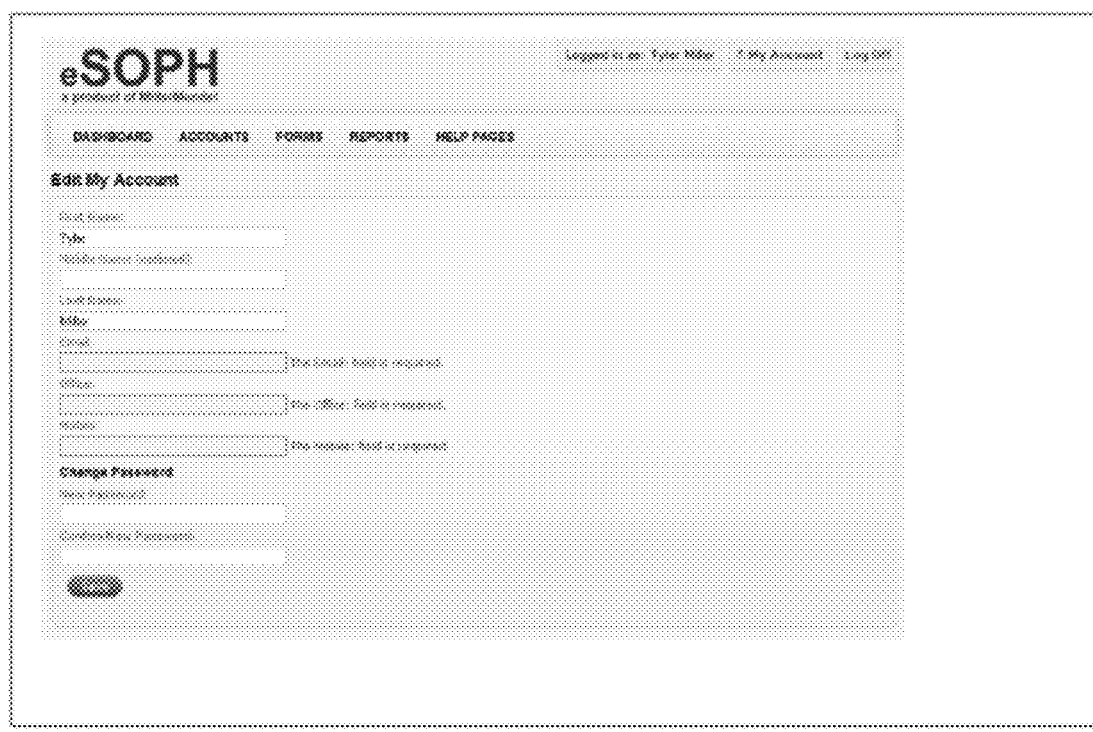
FIG. 7 is a screen display of a currently logged in user's My Account page where their account information can be edited.
Figure 8:
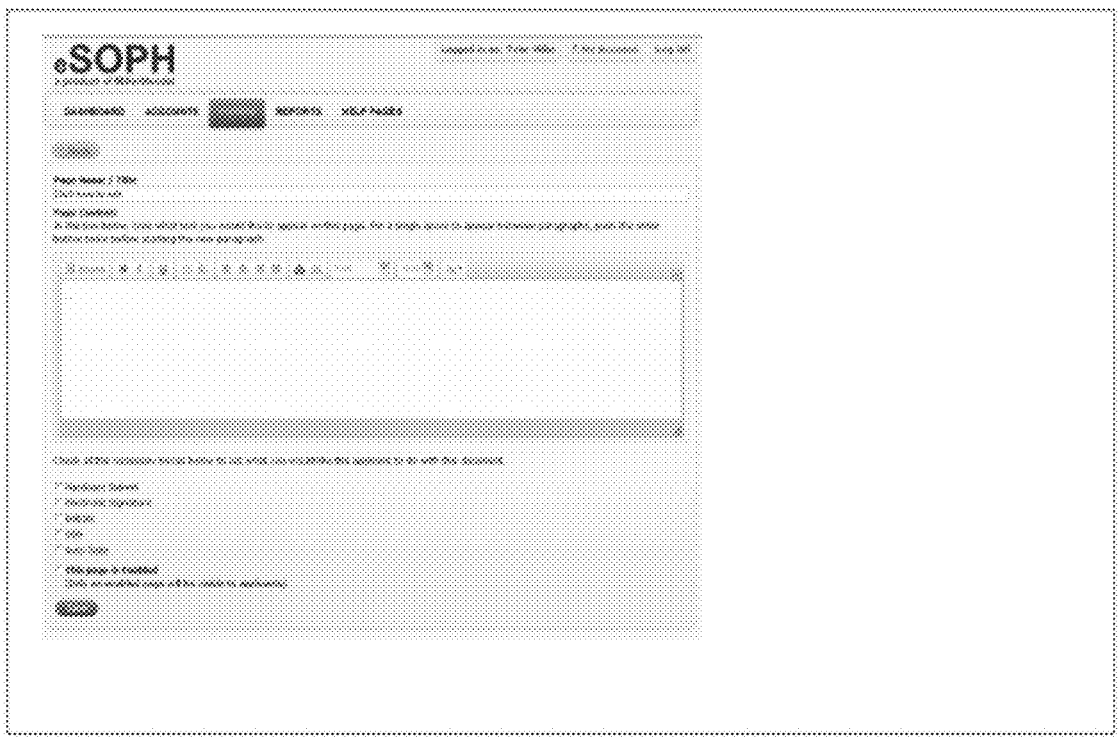
FIG. 8 is a screen display of the edit mode of a form within the Agreements & Advisements section of the system, and certain properties that can be selected for it.
Figure 9:
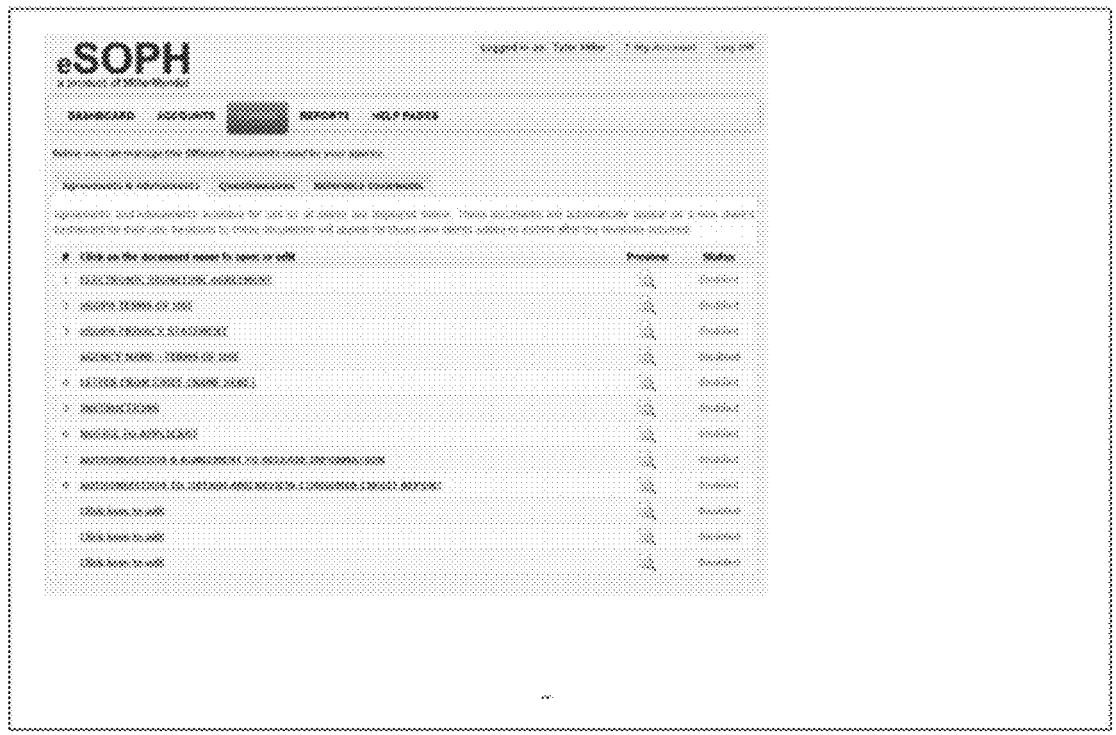
FIG. 9 is a screen display of a page showing documents under Agreements & Advisements, and their status.
Figure 10:
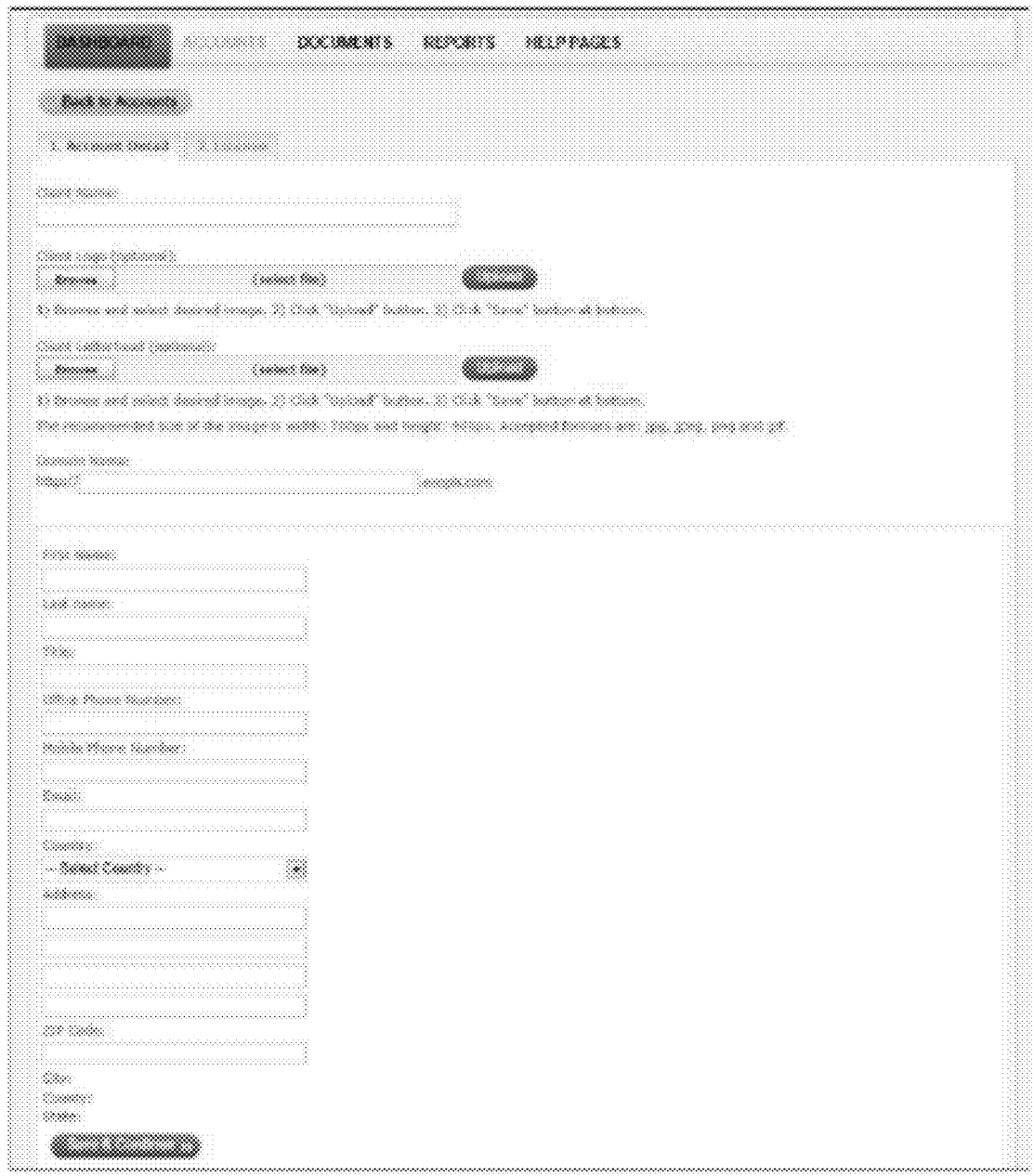
FIG. 10 is a screen display of an account editing function of the system wherein account-specific information for an account on the system may be edited.
Figure 11:
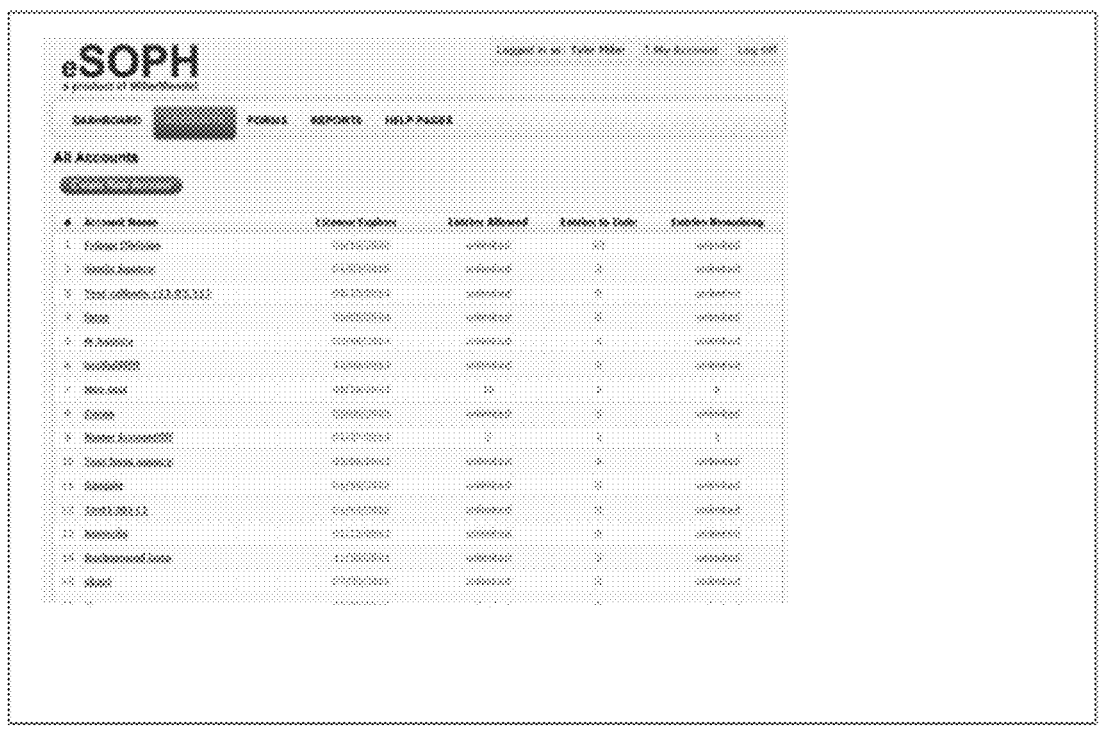
FIG. 11 is a screen display of a page where accounts entered on the system can be viewed, along with their associated account information.
Figure 12:
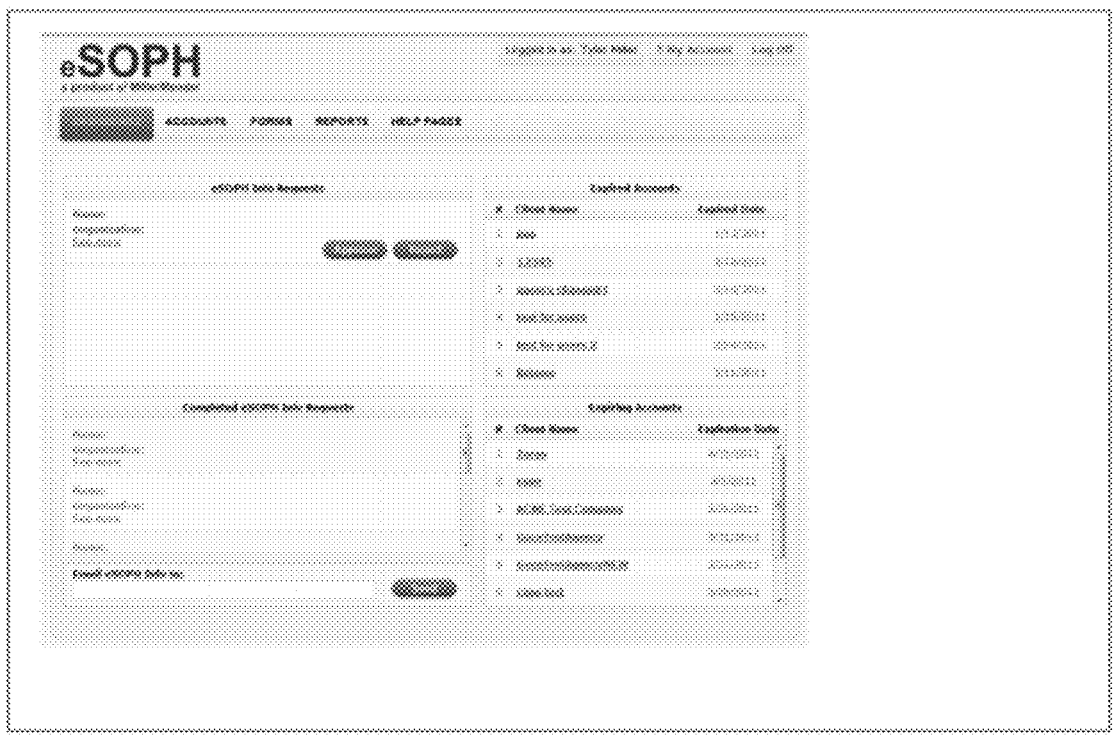
FIG. 12 is a screen display of a "dashboard" of an administrative user, wherein information about entered accounts and information requests is displayed.
Figure 14:
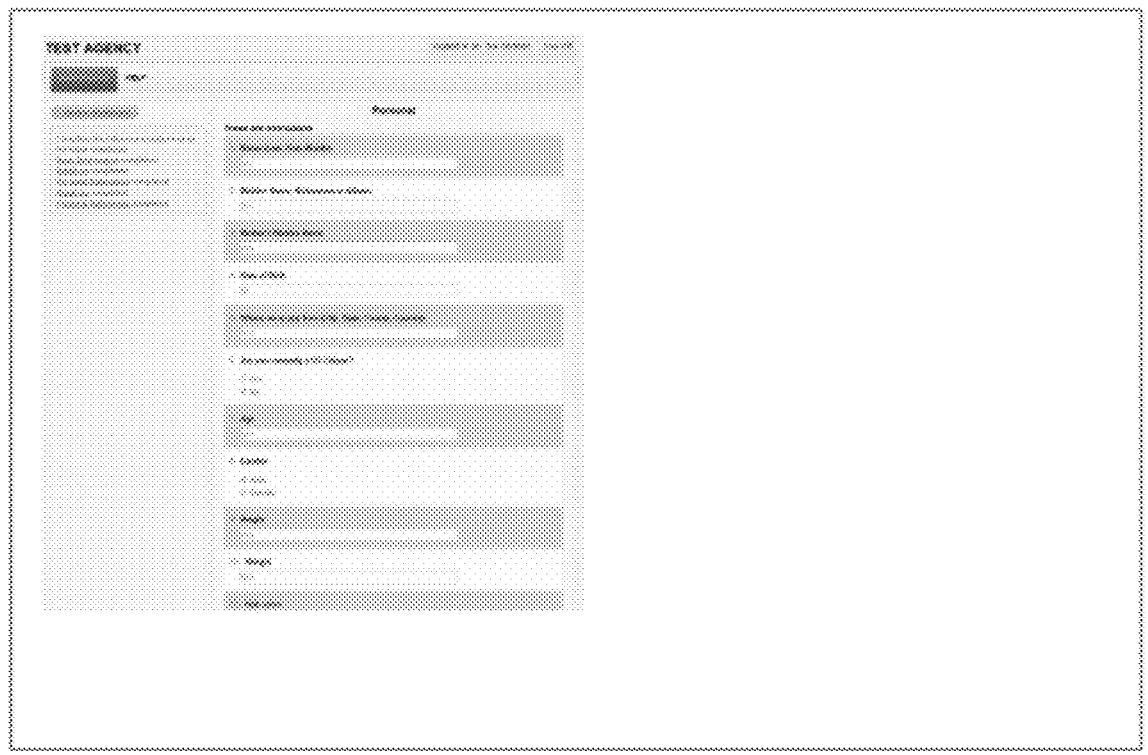
FIG. 14 is a screen display of a fill-able questionnaire/form where an applicant types in responses to questions.
Figure 15:
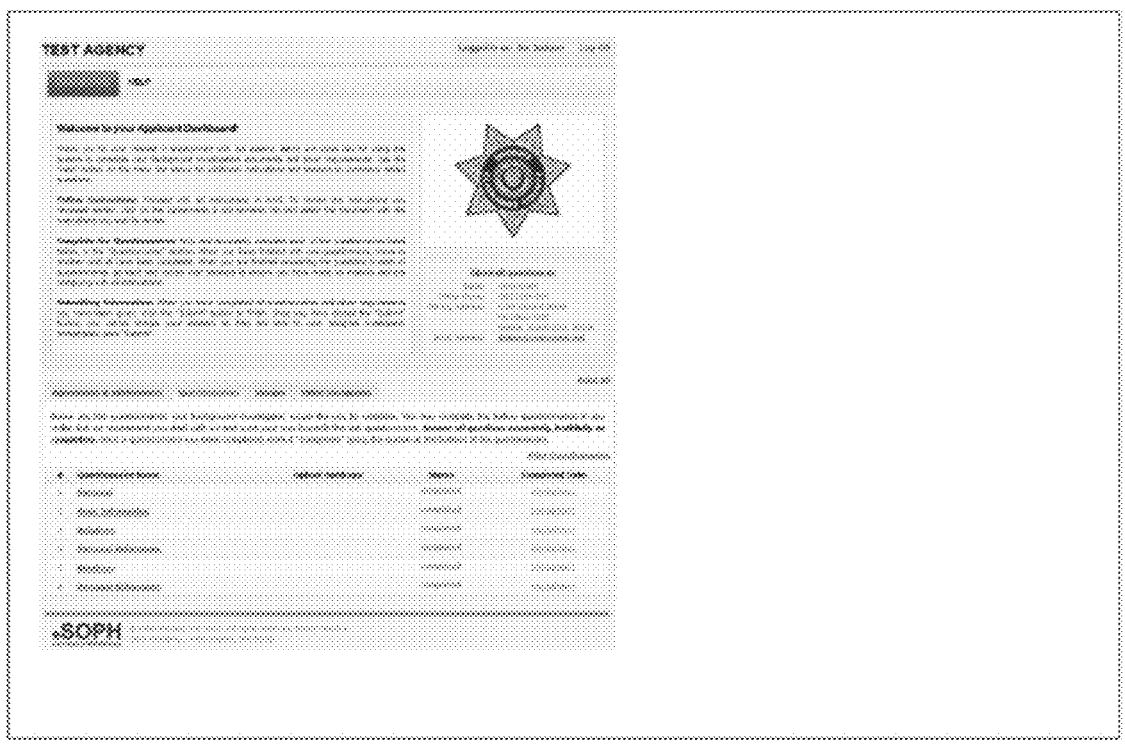
FIG. 15 is a screen display of a page where questionnaire documents selected for an applicant appear for the applicant to open and complete.
Figure 16:
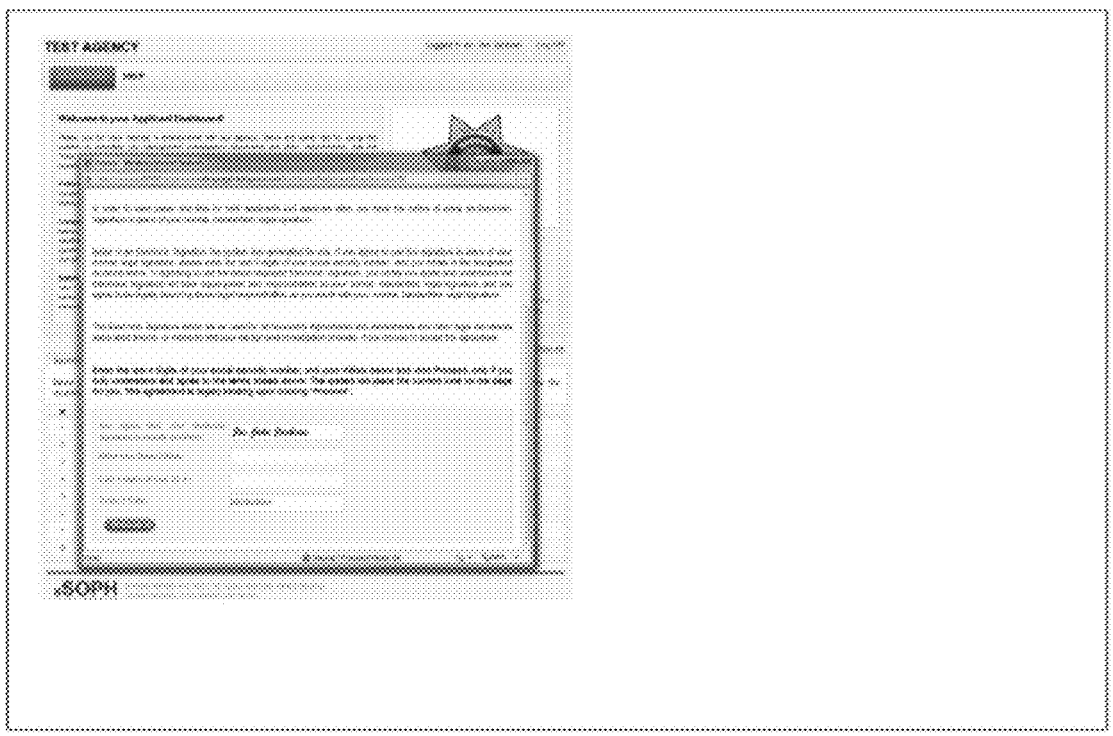
FIG. 16 is a screen display of a document ("Agreement & Advisement"), showing different methods in which an applicant acknowledges the document.
Figure 17:
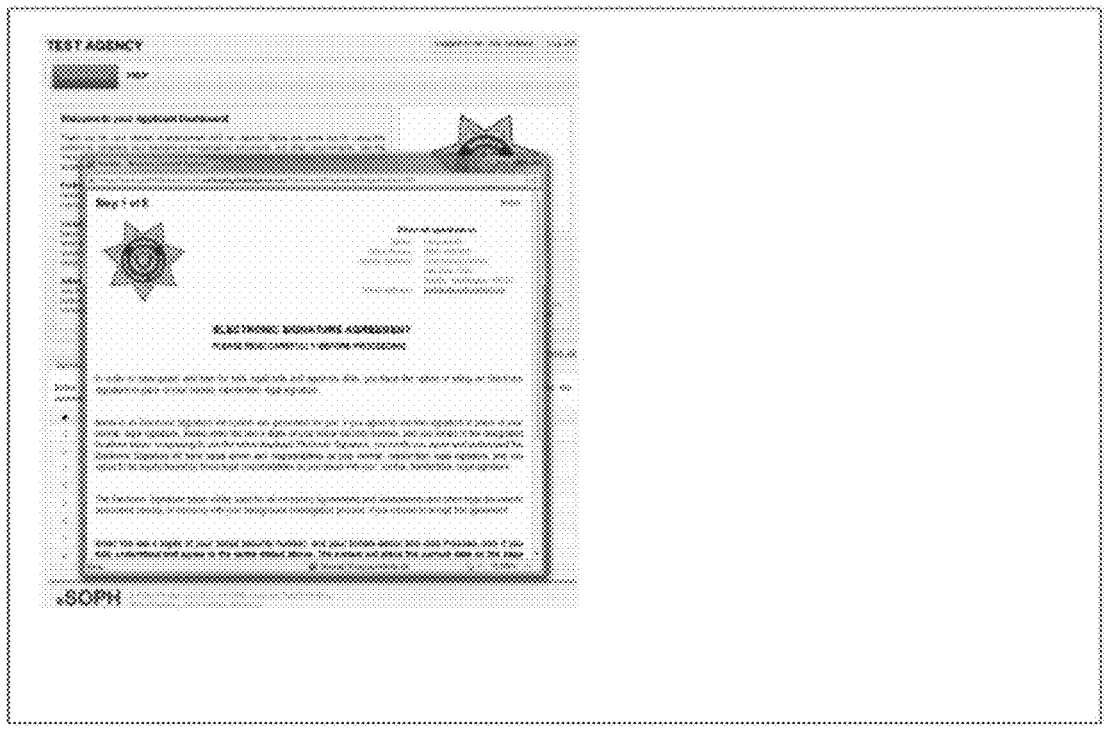
FIG. 17 is a screen display of part of a document ("Agreement & Advisement"), showing the agency user's contact info who has been assigned to the applicant and the documents title.
Figure 18:
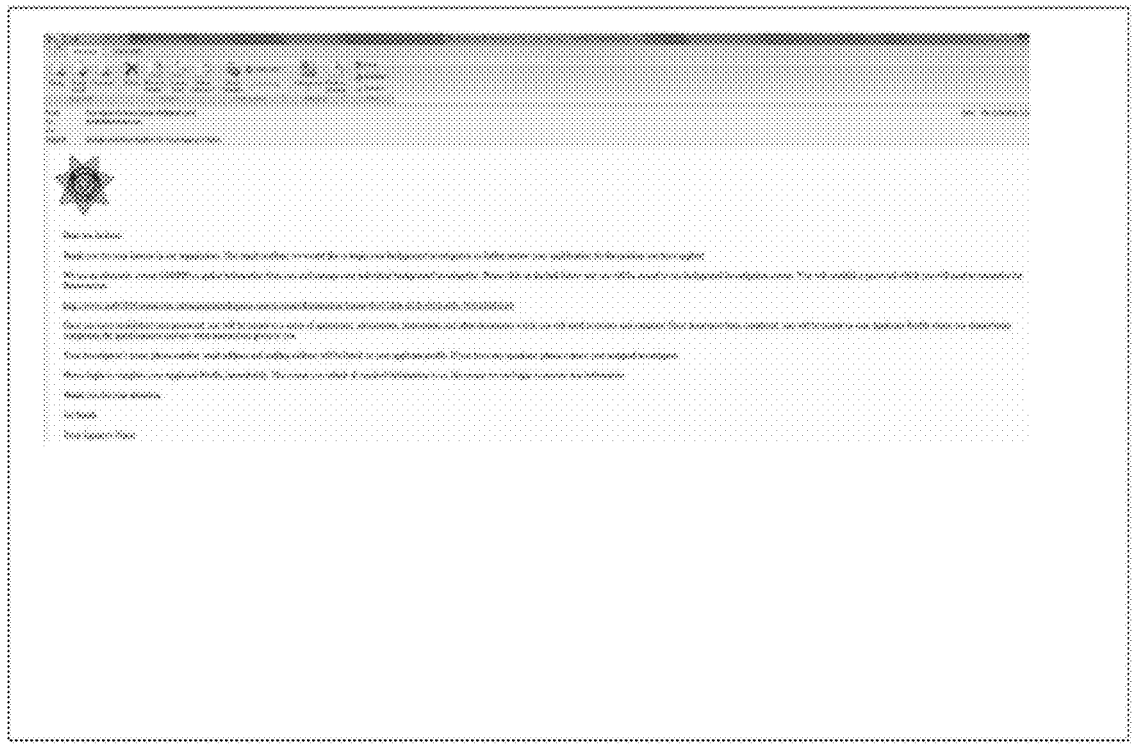
FIG. 18 is a screen display of a registration email sent to an applicant inviting them to click on a link to enter the system for the first time.
Figure 19:
FIG. 19 is a screen display of an account editing function within the system wherein the user can edit their account information.

System Access:

(FIGS. 2, 10,) The admin can set the access limitations for each organization's use. This includes the number of the applicants the organization can enter into the system within a specified date range. If the organization attempts to enter an applicant into the software system and it's outside the parameters set by the admin, the organization's user will be informed to contact the managing company that manages the software system to arrange for additional system access. Organizations can view and access information for applicants which they have previously entered into the software system.

Reports:

(FIG. 21) Reports for organizations include the following parameters: By Position (allows organization personnel to see reports on the number of applicants approved, suspended, Not Selected—eligible to reapply, Not Selected—ineligible to reapply).

General reports include the following parameters: By age range, by ethnic origin, gender and by agency user. The categories for each of the above is: Pending Assignment, Assigned, approved, suspended, Not Selected—eligible to reapply, Not Selected—ineligible to reapply and the average time of an investigation for each of these parameters. Users can also specify a date range to search.

On the company control panel/dashboard, the following reports are features of the software system, for each Account in the system: Active From (date), Active Through (date), Applicants entries allowed, Applicants entered into the system to date, Remaining number of applicant entries, and number of users at the user organization.

Help Pages:

Help content is available to each user on the system by clicking on the "Help" button on the menu bar while the user is logged in. The system produces a page of help content. The help content is specific to the type of user (Admin, User, and Applicant). The help content is changeable through the control panel/dashboard.

While the preferred embodiment of the subject matter has been illustrated and described, it will be appreciated that various changes can be made therein without departing from the spirit and scope of the subject matter.

Figure 62:
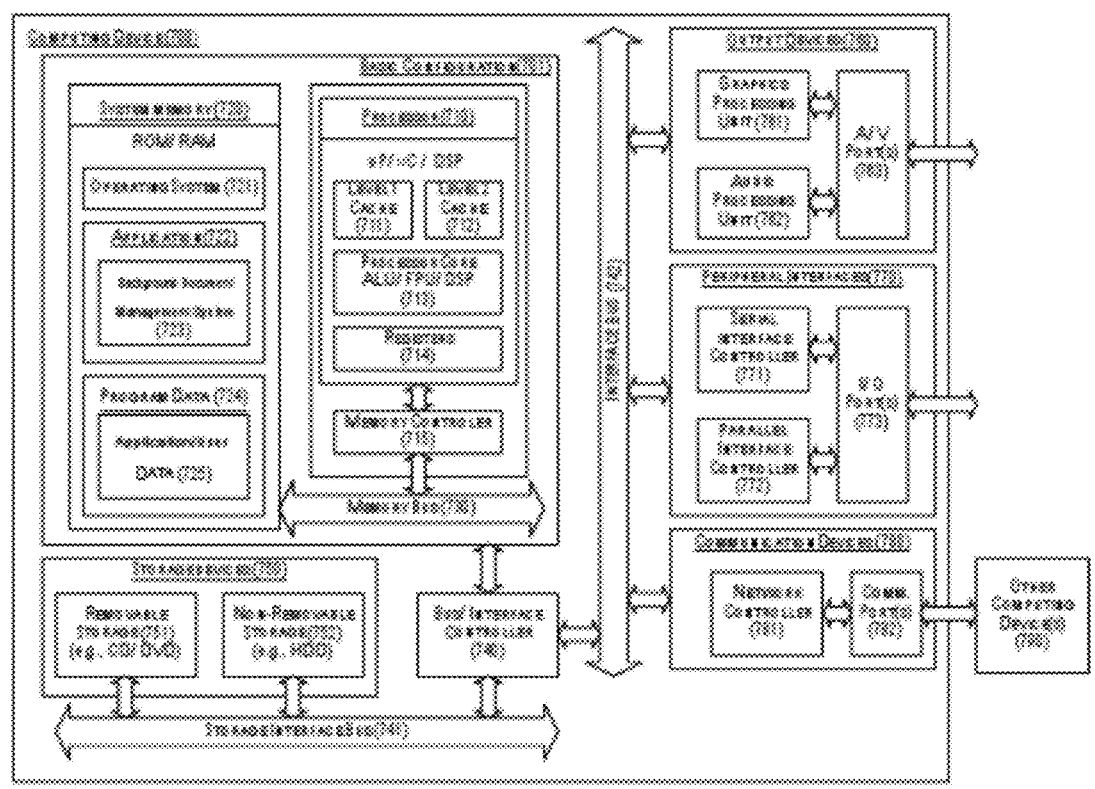
FIG. 62 is a block diagram illustrating an example computing device that may be used to implement one or more components of the illustrative software system, in accordance with the present disclosure

FIG. 62 is a block diagram illustrating an example computing device 700 that may be used to implement one or more embodiments of the software system 100, in accordance with the present disclosure. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (IP), a microcontroller (μC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Figure 50:
Figure 51:
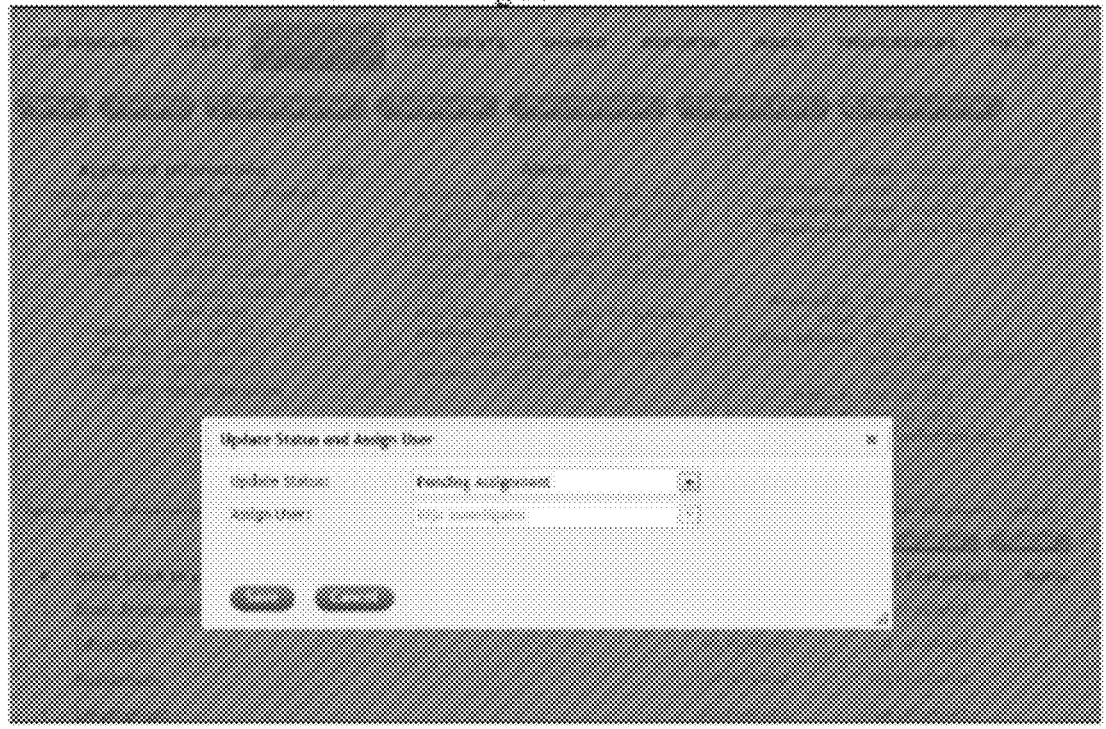

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 may include background document management software system 723, in accordance with the present disclosure. Program Data 724 may include applicant or organizational data 725 that may be useful as has been further described above. In some embodiments, application 722 can be arranged to operate with program data 724 on an operating system 721 such that operation of a system may be facilitated on general purpose computers. This described basic configuration is illustrated in FIG. 50 by those components within line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media (or computer-readable medium) includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which can be arranged to facilitate communications with one or more other computing devices 790 over a network communication via one or more communication ports 782. The communication link is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) computer such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

Figure 63:
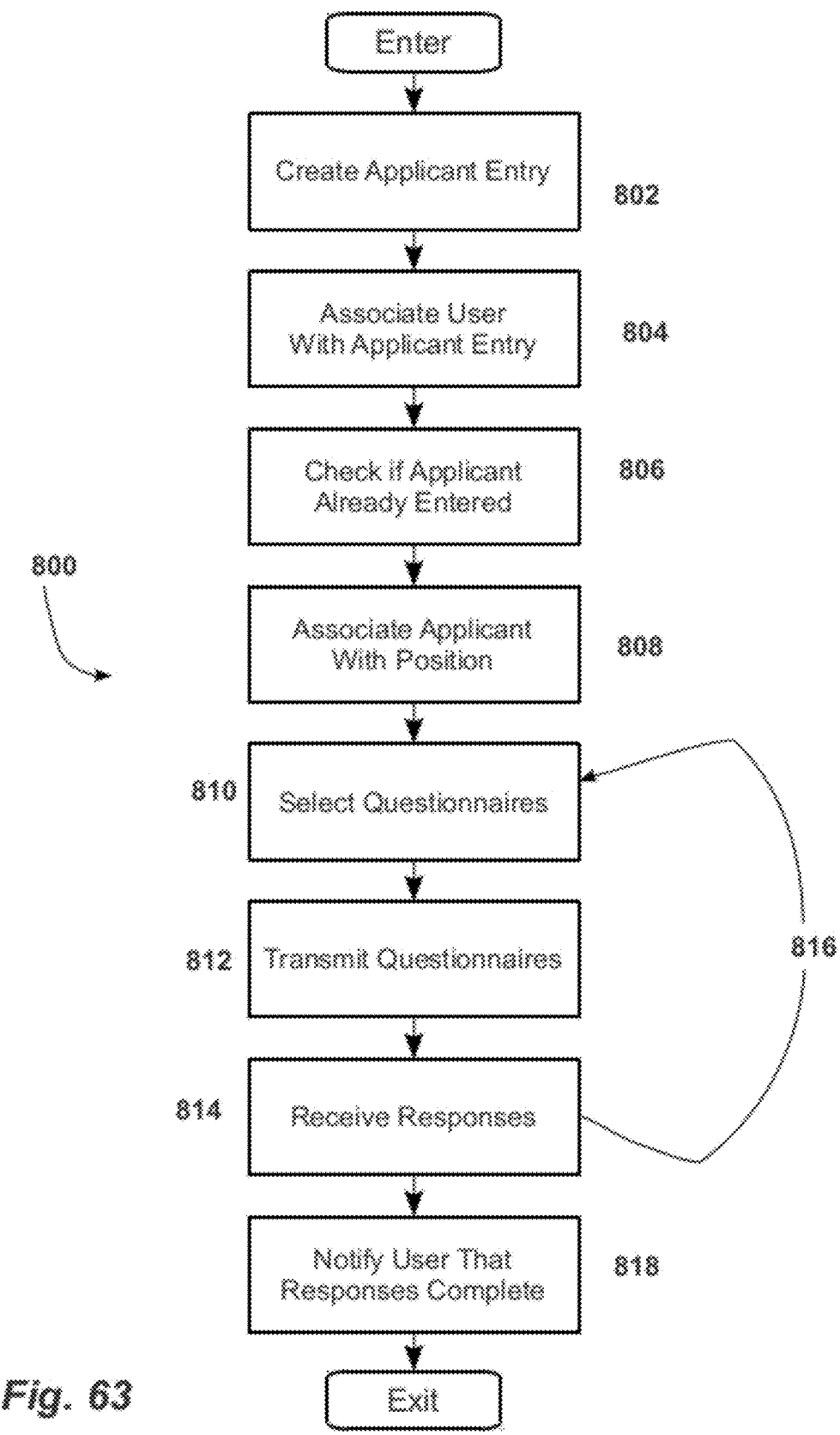
FIG. 63 is an operational flow diagram generally illustrating a process that may be implemented by various embodiments of the background investigation management system.

Referring now to FIG. 63, a conceptual flow diagram illustrates one illustrative process 800 that may be embodied by the system 100. The steps of the process 800 are illustrated sequentially, but it should be appreciated that these steps may be performed in any random order and the process 800 is not defined by this particular illustrative order. The process 800 begins after an applicant applies for a position with an organization. In one specific example, the organization is a law-enforcement organization and the position is one requiring a background investigation. Accordingly, process 800 begins once an individual has been selected for a background check.

At step 802, the organization creates an applicant entry in the system. As used herein, the term "organization" generally refers to a particular organizational user, such as an administrative or other higher-rights user affiliated with the organization. Alternatively, the term "organization" may refer to any non-applicant user of the software system. The applicant entry represents a system record associated with the applicant for the position with the organization, and for whom the background check will be performed. Any organizational user with appropriate rights may create the applicant entry.

At step 804, the organization associates a particular organizational user with the applicant entry. Generally, this step assigns responsibility for the applicant's background check to that particular organizational user.

At optional step 806, the system may perform an internal check to determine if the individual associated with the applicant entry already has another applicant entry from a different or previous organization, or perhaps from an earlier background check with the same organization. This check enables the system to notify the organization early in case there were some issues with the individual earlier, possibly obviating the need to perform another background investigation.

At step 808, the organization associates the applicant entry with a particular "position" within the organization. Each position may have its own requirements and background criteria that should be investigated. Accordingly, each "position" has an associated set of pre-defined electronic documents (questionaires) that have been pre-prepared with questions relevant to that position. See FIGS. 28, 29, 31, 27, 30, 5.

At step 810, the organizational user is presented with an option to select additional documents for the applicant to fill out, to deselect one or more of the pre-selected documents, or to accept the set of pre-selected documents.

At step 812, with the operative set of documents selected, the organizational user causes to be transmitted that set of documents to the applicant. There are two distinct options for transmitting the set of documents to the applicant. In a first option, the system may automatically generate portable document format ("PDF") versions of the documents and deliver the PDF versions of the documents directly to the applicant, such as by e-mail. In a second option, an e-mail transmission is sent to the applicant with an electronic invitation (such as an electronic link back) to return and login to the system and electronically "fill out" the documents online. The latter option results in greater efficiency in that hardcopy documents may be eliminated, and the applicant's information may be entered only once, thereby eliminating human error. In one enhancement, the applicant may be presented with a page that allows the applicant to upload additional documents or images, such as supporting documents, from the applicant's remote system.

At step 814, if and when the applicant responds to the invitation (e.g., logs on to the system), the applicant is prompted to answer the questions in each of the set of questionnaires. In one example, the applicant may be requested to provide information that generates additional transmissions, such as to identify additional individuals (e.g., character references, or the like). If the applicant identifies additional individuals, the system may generate second-order invitations for transmission to those additional individuals, such as references. In one example, an applicant my identify a character reference while filling out the applicant's online documents. In response, the system may automatically generate a second set of documents related to that class of reference (e.g, relative, former employer, or creditor).

At step 816, the system iterates over the preceding steps until necessary documentation has been transmitted to all or substantially all interested individuals.

At step 818, once the required amount of information has been provided by those who have been invited to respond (applicant and any references), the system my initiate an alert to inform the organizational user of that fact, thus ensuring the organizational user has any information that would be necessary for the background investigation in one location, and easily accessible. In this way, the organizational user need not be concerned with personally tracking whether all the necessary information is available prior to performing the complete background investigation.

While various embodiments have been disclosed herein, other aspects and embodiments will be apparent to those skilled in art. The various embodiments disclosed herein are for purposes of illustration and are not intended to be limiting, with the true scope and spirit being limited only by the following claims.

The embodiments of the invention in which an exclusive property or privilege is claimed are defined as follows:

1. A method for a computing device with a processor and a system memory to assist an investigator in conducting a background investigation of an applicant for a position within a first organization, comprising the steps of:

receiving program data identifying the applicant, the position, the first organization, and the investigator;

storing a new applicant entry in the system memory, the new applicant entry associated with the program data identifying the applicant, the position, the first organization, and the investigator;

transmitting an applicant hyperlink to an applicant email address associated with the applicant, the applicant hyperlink for viewing an applicant set of electronic documents;

receiving an applicant electronic response with program data regarding a first reference, wherein the first reference is a first person likely to have information regarding the applicant, the program data including a first reference email address associated with the first reference;

determining a reference class of the first reference based on the program data regarding the first reference;

selecting a first reference set of electronic documents based on the reference class of the first reference; transmitting a first reference hyperlink to the first reference email address, the first reference hyperlink for viewing the first reference set of electronic documents associated with the position;

receiving a first reference electronic response to the first reference set of electronic documents from the first reference;

storing the first reference electronic response in the system memory, associating the first reference electronic response with the new applicant entry; and obtaining an applicant residential address from the applicant electronic response;

generating a suggested reference list of one or more law enforcement agencies and/or courts within a pre-defined radius around the applicant residential address; and presenting the suggested reference list to the investigator.

2. The method of claim 1, further comprising the steps of:

searching for a previous applicant entry in the system memory associated with the applicant and a second organization different from the first organization, the previous applicant entry having program data regarding the applicant and a previous background investigation conducted on the applicant by the second organization for a previous position in the second organization; and sending program data from the previous applicant entry to the investigator.

3. The method of claim 1, further comprising the steps of:

presenting to the investigator, prior to transmitting the applicant hyperlink for viewing the applicant set of electronic documents, an option of changing one or more documents in the applicant set of electronic documents.

4. The method of claim 1, wherein one document of the applicant set of electronic documents is an inter-active questionnaire in which a next question presented to the reference is based on a response to a prior question.

5. A non-transitory computer-readable medium having stored thereon instructions which, when executed by a processor of a computing device with a system memory, cause the computing device to perform the steps of a method to assist an investigator in conducting a background investigation of an applicant for a position within a first organization, the steps of the method comprising:

receiving program data identifying the applicant, the position, the first organization, and the investigator;

storing a new applicant entry in the system memory, the new applicant entry associated with the program data identifying the applicant, the position, the first organization, and the investigator;

transmitting an applicant hyperlink to an applicant email address associated with the applicant, the applicant hyperlink for viewing an applicant set of electronic documents;

receiving an applicant electronic response with program data regarding a first reference, wherein the first reference is a first person likely to have information regarding the applicant, the program data including a first reference email address associated with the first reference;

determining a reference class of the first reference based on the program data regarding the first reference;

selecting a first reference set of electronic documents based on the reference class of the first reference;

transmitting a first reference hyperlink to the first reference email address, the first reference hyperlink for viewing the first reference set of electronic documents associated with the position;

receiving a first reference electronic response to the first reference set of electronic documents from the first reference;

storing the first reference electronic response in the system memory, associating the first reference electronic response with the new applicant entry; and obtaining an applicant residential address from the applicant electronic response;

generating a suggested reference list of one or more law enforcement agencies and/or courts within a pre-defined radius around the applicant residential address; and presenting the suggested reference list to the investigator.

6. The non-transitory computer-readable medium of claim 5, having stored thereon additional instructions which, when executed by the processor of the computing device, cause the computing device to perform the step of:

searching for a previous applicant entry in the system memory associated with the applicant and a second organization different from the first organization, the previous applicant entry having program data regarding the applicant and a previous background investigation conducted on the applicant by the second organization for a previous position in the second organization; and sending program data from the previous applicant entry to the investigator.

7. The non-transitory computer-readable medium of claim 5, having stored thereon additional instructions which, when executed by the processor of the computing device, cause the computing device to perform the steps of:

presenting to the investigator, prior to transmitting the applicant hyperlink for viewing the applicant set of electronic documents, an option of changing one or more documents in the applicant set of electronic documents.

8. The non-transitory computer-readable medium of claim 5, wherein one document of the applicant set of electronic documents is an inter-active questionnaire in which a next question presented to the reference is based on a response to a prior question.

9. A computing device configured to assist an investigator in conducting a background investigation of an applicant for a position within a first organization, comprising:

a processor; and a system memory, the system memory having instruction stored therein that when executed by the processor, cause the computing device to perform the steps of:

receiving program data identifying the applicant, the position, the first organization, and the investigator;

storing a new applicant entry in the system memory, the new applicant entry associated with the program data identifying the applicant, the position, the first organization, and the investigator;

transmitting an applicant hyperlink to an applicant email address associated with the applicant, the applicant hyperlink for viewing an applicant set of electronic documents;

receiving an applicant electronic response with program data regarding a first reference, wherein the first reference is a first person likely to have information regarding the applicant, the program data including a first reference email address associated with the first reference;

determining a reference class of the first reference based on the program data regarding the first reference;

selecting a first reference set of electronic documents based on the reference class of the first reference;

transmitting a first reference hyperlink to the first reference email address, the first reference hyperlink for viewing the first reference set of electronic documents associated with the position;

receiving a first reference electronic response to the first reference set of electronic documents from the first reference;

storing the first reference electronic response in the system memory, associating the first reference electronic response with the new applicant entry; and obtaining an applicant residential address from the applicant electronic response;

generating a suggested reference list of one or more law enforcement agencies and/or courts within a pre-defined radius around the applicant residential address; and presenting the suggested reference list to the investigator.

10. The computing device of claim 9, further comprising additional instructions stored in the system memory which, when executed by the processor of the computing device, cause the computing device to perform the step of:

searching for a previous applicant entry in the system memory associated with the applicant and a second organization different from the first organization, the previous applicant entry having program data regarding the applicant and a previous background investigation conducted on the applicant by the second organization for a previous position in the second organization; and sending program data from the previous applicant entry to the investigator.

11. The computing device of claim 9, further comprising additional instructions stored in the system memory which, when executed by the processor of the computing device, cause the computing device to perform the step of:

presenting to the investigator, prior to transmitting the applicant hyperlink for viewing the applicant set of electronic documents, an option of changing one or more documents in the applicant set of electronic documents.

12. The computing device of claim 9, wherein one document of the applicant set of electronic documents is an inter-active questionnaire in which a next question presented to the reference is based on a response to a prior question.

13. The computing device of claim 9, further comprising additional instructions stored in the system memory which, when executed by the processor of the computing device, cause the computing device to perform the step of:

creating a plurality of questionnaires each being a member of at least one class of a plurality of classes of questionnaires, each class being related to a type of reference; and including a first questionnaire of the plurality of questionnaires in the first reference set of electronic documents, the first questionnaire in one of the plurality of classes that is related to the type of the first reference.

14. The computing device of claim 13, further comprising additional instructions stored in the system memory which, when executed by the processor of the computing device, cause the computing device to perform the step of:

receiving instructions from the investigator to edit one of the questionnaires.

* * * * *